US010845245B2

(12) United States Patent
Olson

(10) Patent No.: US 10,845,245 B2
(45) Date of Patent: Nov. 24, 2020

(54) DIGITAL PATHOLOGY COLOR CALIBRATION AND VALIDATION

(71) Applicant: Leica Biosystems Imaging, Inc., Vista, CA (US)

(72) Inventor: Allen Olson, San Diego, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 9 days.

(21) Appl. No.: 16/095,267

(22) PCT Filed: Apr. 20, 2017

(86) PCT No.: PCT/US2017/028532
§ 371 (c)(1),
(2) Date: Oct. 19, 2018

(87) PCT Pub. No.: WO2017/184821
PCT Pub. Date: Oct. 26, 2017

(65) Prior Publication Data
US 2019/0137339 A1    May 9, 2019

Related U.S. Application Data

(60) Provisional application No. 62/325,330, filed on Apr. 20, 2016.

(51) Int. Cl.
*G01J 3/46* (2006.01)
*G01J 3/50* (2006.01)
(Continued)

(52) U.S. Cl.
CPC ............. *G01J 3/462* (2013.01); *G01J 1/08* (2013.01); *G01J 3/10* (2013.01); *G01J 3/28* (2013.01);
(Continued)

(58) Field of Classification Search
CPC ........... G01N 15/1475; G01N 15/1468; G01N 1/312; G01N 2015/1472;
(Continued)

(56) References Cited

U.S. PATENT DOCUMENTS 5,119,186 A * 6/1992 Deacon ................ G06T 11/001
345/600
6,118,946 A   9/2000 Ray et al.
(Continued)

FOREIGN PATENT DOCUMENTS

CN    103975382 A    8/2014
CN    108140249 A    6/2018
(Continued)

OTHER PUBLICATIONS

Martinez-Garcia, et al. "Color calibration of an RGB digital camera for the microscopic observation of highly specular materials," Electronic Imaging 2015, conference: Measuring, Modeling, and Reproducing Material Appearance, May 27, 2015. http://hai-iogs.archives-ouvertes.fr/hal-01135969/document.
(Continued)

*Primary Examiner* — Aklilu K Woldemariam
(74) *Attorney, Agent, or Firm* — Procopio; Pattric J. Rawlins; Jonathan D. Cheng

(57) ABSTRACT

Color calibration for digital pathology is provided. A standard glass slide is prepared with a specimen having zero or more stains. The specimen is scanned a first time using a hyperspectral imaging system to produce a first digital image having XYZ color values. The specimen is scanned a second time using a digital pathology imaging system to produce a second digital image having RGB color values. The first and second digital images are then registered against each other to align the digital image data. Individual pixels of the first and second images may be combined in the
(Continued)

registration process so that the first and second digital images have substantially similar pixel sizes. A lookup table is generated to associate XYZ color values to RGB color values. Once the lookup table has been generated, it can be used to present RGB color on a display using the corresponding XYZ color.

16 Claims, 9 Drawing Sheets

(51) Int. Cl.
| G01N 1/30 | (2006.01) |
| G01J 1/08 | (2006.01) |
| G01J 3/10 | (2006.01) |
| G01J 3/28 | (2006.01) |
| G02B 21/32 | (2006.01) |
| G06T 7/80 | (2017.01) |
| G06T 7/33 | (2017.01) |
| G06T 7/90 | (2017.01) |
| G01N 21/27 | (2006.01) |
| G02B 21/36 | (2006.01) |
| G06T 3/00 | (2006.01) |
| G06T 3/40 | (2006.01) |
| G06T 7/00 | (2017.01) |
| G06K 9/62 | (2006.01) |

(52) U.S. Cl.
CPC . *G01J 3/46* (2013.01); *G01J 3/50* (2013.01); *G01N 1/30* (2013.01); *G01N 21/27* (2013.01); *G02B 21/32* (2013.01); *G02B 21/367* (2013.01); *G06T 3/0068* (2013.01); *G06T 3/40* (2013.01); *G06T 7/0012* (2013.01); *G06T 7/33* (2017.01); *G06T 7/80* (2017.01); *G06T 7/90* (2017.01); *G06K 9/6202* (2013.01); *G06T 2207/10024* (2013.01); *G06T 2207/10056* (2013.01); *G06T 2207/30168* (2013.01)

(58) Field of Classification Search
CPC ....... G01N 2015/1497; G01N 15/0227; G01N 15/1463; G06K 9/00127; G06K 9/00134; G06K 9/3233; G06K 9/4652; G06K 9/0014; G06K 9/036; G02B 21/244; G02B 21/367; G02B 21/26; G02B 21/365; G06T 7/60; G06T 2207/10024; G06T 11/001; G06T 7/90; G06T 2207/20016; G06T 2207/10144; G06T 2207/20221; G06T 5/009; G06T 5/50; G06T 2207/30168; G06T 7/0002; H04N 7/183; H04N 1/407; H04N 1/6027; Y10T 436/112499
USPC .......... 382/106, 128, 133, 162, 168; 396/89, 396/155, 222, 311, 429; 348/79, 187
See application file for complete search history.

(56) References Cited

U.S. PATENT DOCUMENTS

| 6,215,892 | B1* | 4/2001 | Douglass | G01N 1/312 |
| | | | | 382/128 |
| 6,330,349 | B1* | 12/2001 | Hays | G01N 15/1468 |
| | | | | 382/128 |
| 6,718,053 | B1* | 4/2004 | Ellis | G01N 15/1475 |
| | | | | 345/604 |
| 8,611,654 | B2* | 12/2013 | Yadav | H04N 1/407 |
| | | | | 382/167 |
| 9,418,414 | B2 | 8/2016 | Motomura et al. | |
| 2002/0001080 | A1 | 1/2002 | Miller et al. | |
| 2002/0180764 | A1 | 12/2002 | Gilbert et al. | |
| 2004/0066960 | A1 | 4/2004 | McLaren et al. | |
| 2004/0252875 | A1* | 12/2004 | Crandall | G02B 21/34 |
| | | | | 382/133 |
| 2005/0036668 | A1 | 2/2005 | McLennan et al. | |
| 2006/0118742 | A1* | 6/2006 | Levenson | G01N 21/6456 |
| | | | | 250/559.3 |
| 2009/0167893 | A1* | 7/2009 | Susanu | G06T 5/009 |
| | | | | 348/224.1 |
| 2009/0185041 | A1* | 7/2009 | Kang | G06T 5/003 |
| | | | | 348/208.1 |
| 2010/0027072 | A1* | 2/2010 | Enjuji | G06T 5/40 |
| | | | | 358/3.01 |
| 2010/0188424 | A1* | 7/2010 | Cooke | G06T 5/50 |
| | | | | 345/660 |
| 2011/0109735 | A1* | 5/2011 | Otsuka | G01J 3/027 |
| | | | | 348/79 |
| 2012/0063675 | A1* | 3/2012 | Dittert | G06T 11/40 |
| | | | | 382/162 |
| 2012/0269417 | A1 | 10/2012 | Bautista et al. | |
| 2013/0016885 | A1* | 1/2013 | Tsujimoto | G06T 5/003 |
| | | | | 382/128 |
| 2013/0027720 | A1 | 1/2013 | Satoh | |
| 2013/0094758 | A1* | 4/2013 | Yadav | H04N 1/407 |
| | | | | 382/167 |
| 2014/0055592 | A1 | 2/2014 | Wei et al. | |
| 2014/0105480 | A1 | 4/2014 | Motomura et al. | |
| 2014/0193050 | A1* | 7/2014 | Miller | G06T 5/50 |
| | | | | 382/128 |
| 2014/0204112 | A1 | 7/2014 | Lindbloom | |
| 2014/0300753 | A1 | 10/2014 | Yin et al. | |
| 2016/0094826 | A1 | 3/2016 | Athreyas et al. | |
| 2016/0131524 | A1 | 5/2016 | Arenhold et al. | |
| 2017/0372117 | A1* | 12/2017 | Bredno | G06K 9/4604 |
| 2019/0120694 | A1 | 4/2019 | Yin et al. | |

FOREIGN PATENT DOCUMENTS

| EP | 3021096 A1 | 5/2016 |
| JP | 2003209705 A | 7/2003 |
| JP | 2003230154 A | 8/2003 |
| JP | 2009239419 A | 10/2009 |
| JP | 2015035650 A | 2/2015 |
| JP | 2016048905 A | 4/2016 |

OTHER PUBLICATIONS

International Search Report and Written Opinion issued in copening International Application No. PCT/US2017/028532 dated Jun. 30, 2017 in 29 pages.
Luo et al., "A colour management framework for medical imaging applications", Computerized Medical Imaging and Graphics, Pergamon Press, New York, NY, US (2006) 30(6-7), 1, pp. 357-361, XP024903648, ISSN: 0895-6111, DOI: 10.1016/J.COMPMEDIMAG.2006.09.002.
Notice of Reasons for Refusal dated Nov. 5, 2019 for related Japanese Patent Application No. 2018-555249 and corresponding machine English translation, in 26 pages.
Extended European Search Report dated Nov. 26, 2019 for related European Patent Application No. 17786613.4, in 11 pages.
Office Action for related Chinese Patent Application No. 201780024621.5 and corresponding English translation, in 25 pages.

* cited by examiner

SPECTRAL STACK

XYZ COLOR

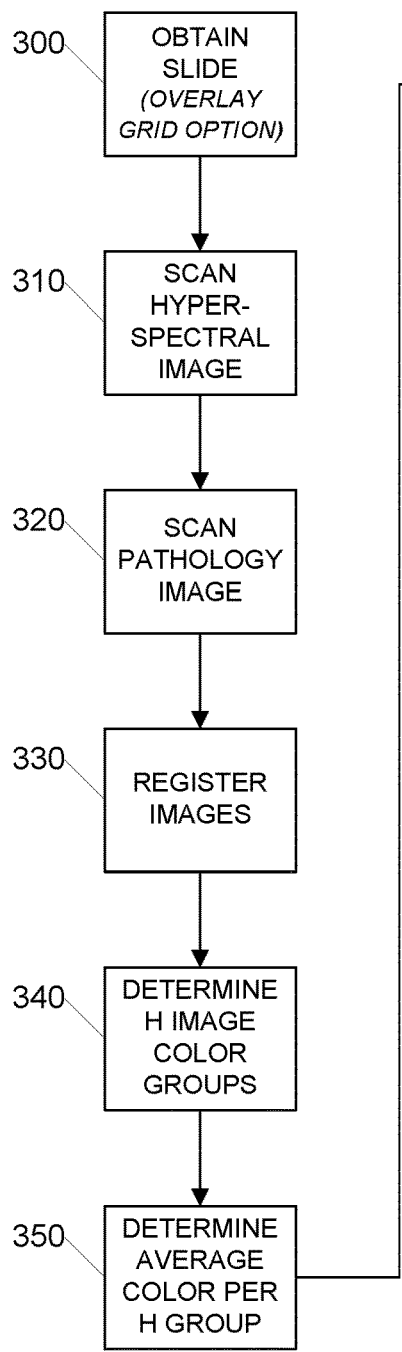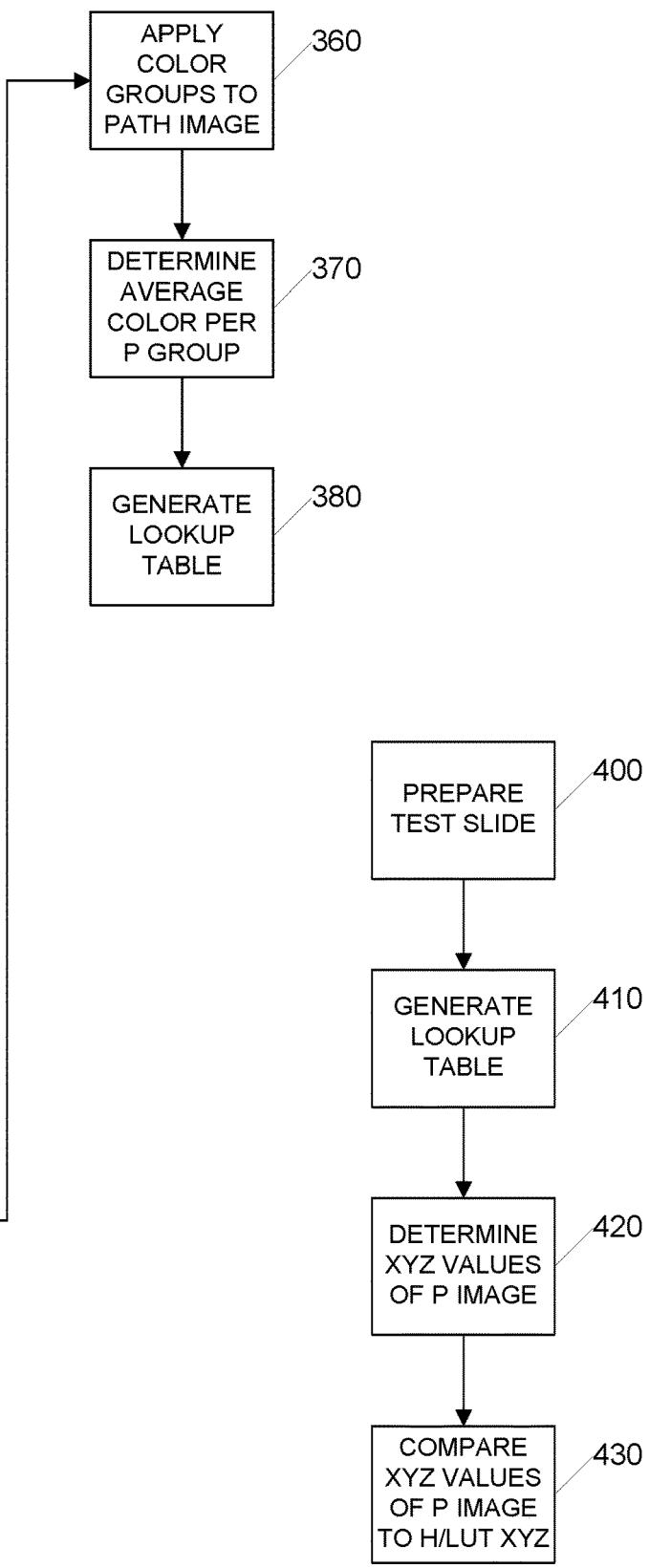
FIG. 5
FIG. 6

DIGITAL PATHOLOGY COLOR CALIBRATION AND VALIDATION

RELATED APPLICATION

The present application claims priority to U.S. provisional patent application No. 62/325,330 filed 20 Apr. 2016, which is incorporated herein by reference in its entirety.

BACKGROUND

Field of the Invention

The present invention generally relates to digital pathology and more specifically relates to systems and methods for calibrating color management in a digital pathology system and validating digital color data in connection with corresponding physical color spectrum.

Related Art

Accurate communication of color information is a continuing challenge in many industries. The most common approach to tackling this challenging problem is to generate specially constructed test targets that represent a particular color. In the photography industry, for example, these specially constructed test targets include an array of rows and columns, with each cell having a constant color. For reflected light applications, the specially constructed test target comes in the form of paper and for transmitted light applications, the specially constructed test target comes in the form of film. For example, for nature photography, the color patches are spectrally matched to blue sky, green foliage, brown skin, and so forth.

In the digital pathology industry, a significant problem exists in that the color being presented on a display is not the same as the color of the stained specimen. Exacerbating this problem is the lack of availability of any specially constructed test targets. This is generally because paper and/or film is an inadequate substitute for tissue as a medium for carrying the stains that contain the color information. Attempts to create such test targets using materials to approximate tissue have been largely unsuccessful. For example, special biopolymer strips have been hand crafted and stained with standard pathology stains. However, hand crafted fabrication of these targets is complex and expensive. Moreover, the specially constructed biopolymer strips, when stained, typically fail to provide an accurate color match to that of the same stain as applied to tissue. Accordingly, the unsolved problem is how to construct a test target that approximates tissue and provides an accurate color match when stains are applied to the test target.

Therefore, what is needed is a system and method that overcomes these significant problems found in the conventional systems as described above.

SUMMARY

To solve the problems discussed above, described herein are systems and methods for calibrating a digital pathology slide scanning system so that the colors of a scanned specimen presented on a display are substantially the same as the colors of the stained or unstained specimen on the physical slide.

The inventor has recognized that because the spectral properties of the staining agent change when bound to tissue, a test target that is constructed to faithfully approximate the characteristics of tissue with or without stains will always suffer significant drawbacks. This is because a proper solution requires that the spectral properties of the test targets match those of the objects being imaged. Accordingly, in the present description the inventor provides a solution that employs one or more standard slides as test targets that are used to successfully calibrate an imaging system.

In one aspect, a standard slide is prepared with a specimen. A single stain or a combination of stains or no stains can be applied to the specimen. A grid is overlayed or superimposed on the slide to divide the specimen into discrete sections. A digital image of the specimen on the slide is then obtained using a hyperspectral imaging system (referred to herein as the "hyperspectral image" or the "H image" or the "HYP image" or the "XYZ image"). Hyperspectral imaging systems are typically image tiling systems and, for example, a single field of view of the hyperspectral imaging system can be captured for each cell in the grid overlay. The resulting hyperspectral image for each cell includes a stack of images ranging between 400 nm and 750 nm (the visual spectrum). The number of images in the stack can vary, for example one image per 10 nm separation. The hyperspectral image stack is then processed to result in an XYZ color image having a plurality of individual picture elements ("pixels") where each pixel has an XYZ color value. The hyperspectral image is then registered to the grid by mapping the top left corner pixel to the top left corner of the grid. The individual pixels in an XYZ color image can be combined to create super pixels, which advantageously reduces pixel location errors when subsequently associating XYZ pixels created by the hyperspectral imaging system to RGB pixels created by the digital pathology system.

Next, the same slide with the grid overlay is scanned using a digital pathology system having a color imaging capability. The resulting digital image (referred to herein as the "pathology image" or the "P image" or the "PATH image" or the "RGB image") has a red, green and blue ("RGB") value for each pixel. The pathology image is then registered to the grid by mapping the top left corner pixel to the top left corner of the grid. The individual pixels in the RGB can also be combined to create super pixels and to match the pixel size of the hyperspectral image to allow for direct color comparison between the XYZ values and the RGB values. Also, the pixel sizes of both the hyperspectral image and the pathology image can be downsized or upsized to optimize the pixel size matching.

Next, a lookup table ("LUT") associating the XYZ color information for a single pixel in the hyperspectral image and the RGB color information for the same pixel in the pathology image is generated. The LUT associates the XYZ and RBG color information for all pixels in the pathology image. Advantageously registration of the hyperspectral image to the pathology image, including image pixel size mapping, results in a one-to-one pixel association in the LUT. However, it is also possible to include in the LUT an average RGB value from a combined number of pixels of the pathology image in association with the XYZ value from a single pixel in the hyperspectral image or vice versa.

Once the LUT has been generated, it can be used by a display module so that the colors of a scanned specimen in a digital image file having RGB color data can be presented on a display using the corresponding hyperspectral XYZ color to result in the displayed color being substantially the same as the colors of the specimen on the physical slide. The displayed color can be measured by a color measurement device such as a colorimeter or a spectrophotometer.

In an alternative embodiment, a standard slide having a specimen is scanned using the hyperspectral imaging system as described above to generate the XYZ image. The same slide is also scanned using the digital pathology system to generate the RGB image. The pixels of the XYZ image and RGB image are registered to each other to align the respective images. If the size of the individual pixels of the imaging sensors in the hyperspectral imaging system and the digital pathology imaging system differ, then pixel combining or downsizing may be employed to facilitate proper alignment of the XYZ and RGB images and proper image pixel size matching.

After scanning, one of the XYZ or RGB images is indexed to identify a small number of colors into which every pixel in the image being indexed can be assigned while also minimizing the error values for each association of an image pixel to a color. For example, while the camera sensor may be capable of sensing millions of colors, the indexing process may advantageously reduce the number of colors in the XYZ image to ten and each pixel in the XYZ image is assigned to one of the ten colors. In one embodiment, during indexing all pixels that are close to the same color are averaged into a single color of the index color palette. This process is done iteratively until all pixels have been assigned to an averaged single color value where the error value of the original pixel color compared to the averaged single color is minimized across all pixels in the XYZ image. In one embodiment, the error value can be minimized using a root mean square analysis.

Once the XYZ image has been indexed, the result is a set of N pixel groups, where N is the index value (ten in the example above) and combining the pixels in the N pixel groups results in the complete XYZ image. A pixel grouping is also referred to herein as an "index." After the XYZ and RGB images have been registered, the pixels in the RGB image can be likewise associated into the same N pixel groups in accordance with the pixel registration between the XYZ and RGB images. Each of the N pixel groups from the RGB image are analyzed to calculate an average color value for each of the N pixel groups. The result is that each index in the XYZ image has an average color value and each index in the RGB image has an average color value and these average color values are used to generate the LUT.

Once the LUT has been generated, it can be used by a display module so that the colors of a scanned specimen in a digital image file having RGB color data can be presented on a display using the corresponding hyperspectral XYZ color to result in the displayed color (e.g., as measured by a colorimeter or spectrophotometer) being substantially the same as the colors of the specimen on the physical slide.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 5 is a flow diagram illustrating an example process for calibrating color values generated by a digital pathology scanning apparatus using a superpixel process according to an embodiment of the invention;

FIG. 6 is a flow diagram illustrating an example process for validating color values generated by a digital pathology scanning apparatus using a superpixel process according to an embodiment of the invention;

DETAILED DESCRIPTION

Certain embodiments disclosed herein provide for color calibration of a digital pathology system. For example, one embodiment disclosed herein allows for a pathology slide to be scanned by a hyperspectral imaging system and the colors of the resulting digital hyperspectral image compared to the colors of a digital image of the same slide scanned by the digital pathology system. The comparison results in a lookup table that translates RGB values into XYZ values so that when the digital slide image scanned by the digital pathology system is presented on a display, the presented colors match the XYZ values corresponding to the true colors of the physical specimen on the slide. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
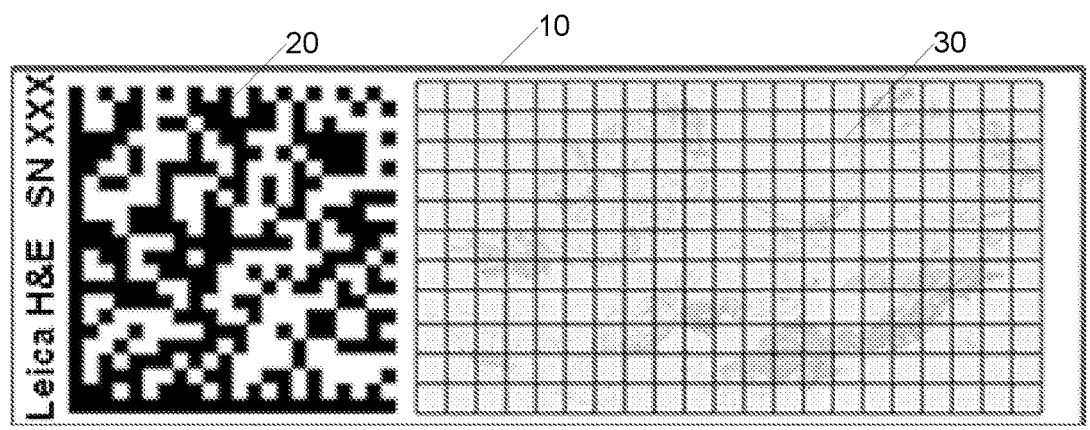
FIG. 1 is a plan view diagram illustrating an example digital pathology slide having a barcode and a grid overlay according to an embodiment of the invention.

FIG. 1 is a plan view diagram illustrating an example digital pathology slide 10 having a barcode 20 and a grid overlay 30 according to an embodiment of the invention. In the illustrated embodiment, the grid overlay 30 is positioned over the sample that is on the slide 10. The grid overlay 30 is used to facilitate registration of the hyperspectral digital image to the digital pathology digital image. An alternative way to register the images is to use image pattern matching of the two digital images in order to align the hyperspectral digital image and the digital pathology digital image. For successful image pattern matching it is helpful to have digital images of the same magnification.

Figure 2:
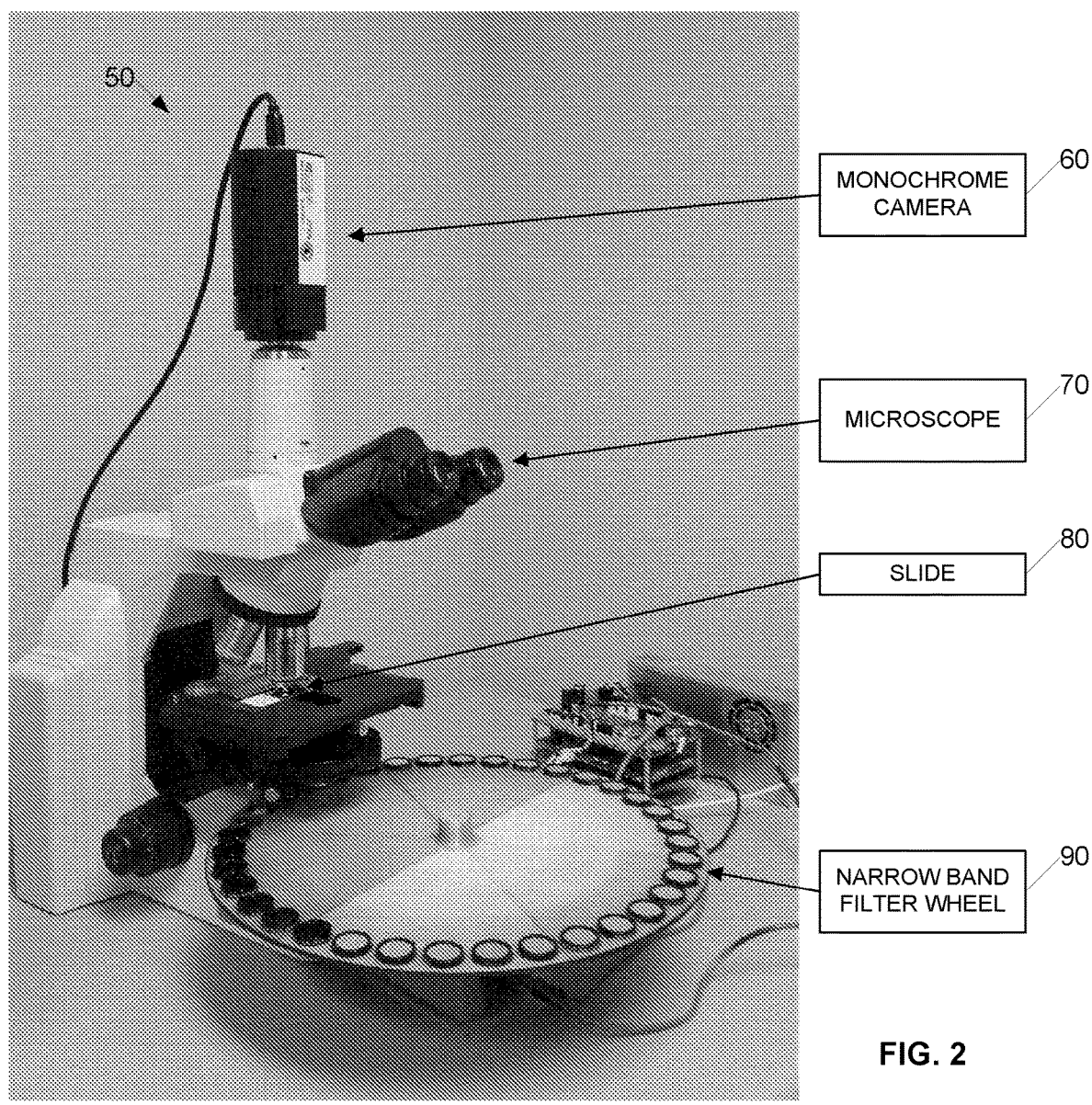
FIG. 2 is a block diagram illustrating an example prior art hyperspectral imaging system according to an embodiment of the invention.

FIG. 2 is a block diagram illustrating an example prior art hyperspectral imaging system 50 according to an embodiment of the invention. In the illustrated embodiment, the hyperspectral imaging system 50 includes a 2D pixel array monochrome camera 60, a microscope 70, a slide 80 that supports a specimen and a narrow band filter wheel 90. In one embodiment, the monochrome camera 60 of the hyperspectral imaging system 50 is a monochrome line scan camera. Preferably, the monochrome line scan camera 60 in the hyperspectral imaging system 50 has the same characteristics as the color line scan camera used in the digital pathology imaging system. Employing line scan cameras having the same characteristics (e.g., pixel size) in both the hyperspectral and digital pathology imaging systems advantageously simplifies image registration by reducing or eliminating the need for pixel matching—or by allowing the pixels to be easily resampled, e.g., by downsampling the pixels into larger superpixels to simplify registration of the XYZ and RGB images.

Figure 3A:
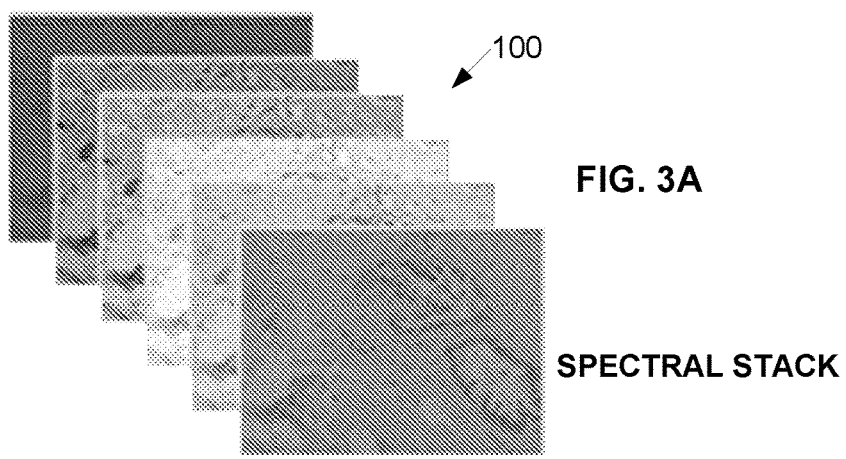
FIG. 3A is a block diagram illustrating an example hyperspectral imaging stack as generated by a hyperspectral imaging system according to an embodiment of the invention.

FIG. 3A is a block diagram illustrating an example hyperspectral imaging stack 100 as generated by a hyperspectral imaging system according to an embodiment of the invention. As will be understood by the skilled artisan, a hyperspectral imaging system generates a set of individual images that are each captured using a different wavelength of light, for example by using a narrow band filter wheel and capturing an image of the same region using each filter of the filter wheel. This set of images is referred to herein as a hyperspectral stack or a spectral stack. A spectral stack is can be generated for an individual region of a sample or for an entire sample/entire slide. For example, in one embodiment, a hyperspectral imaging system using a line scan camera can capture a whole slide image using each filter on the filter wheel to generate a whole slide image spectral stack.

Figure 3B:
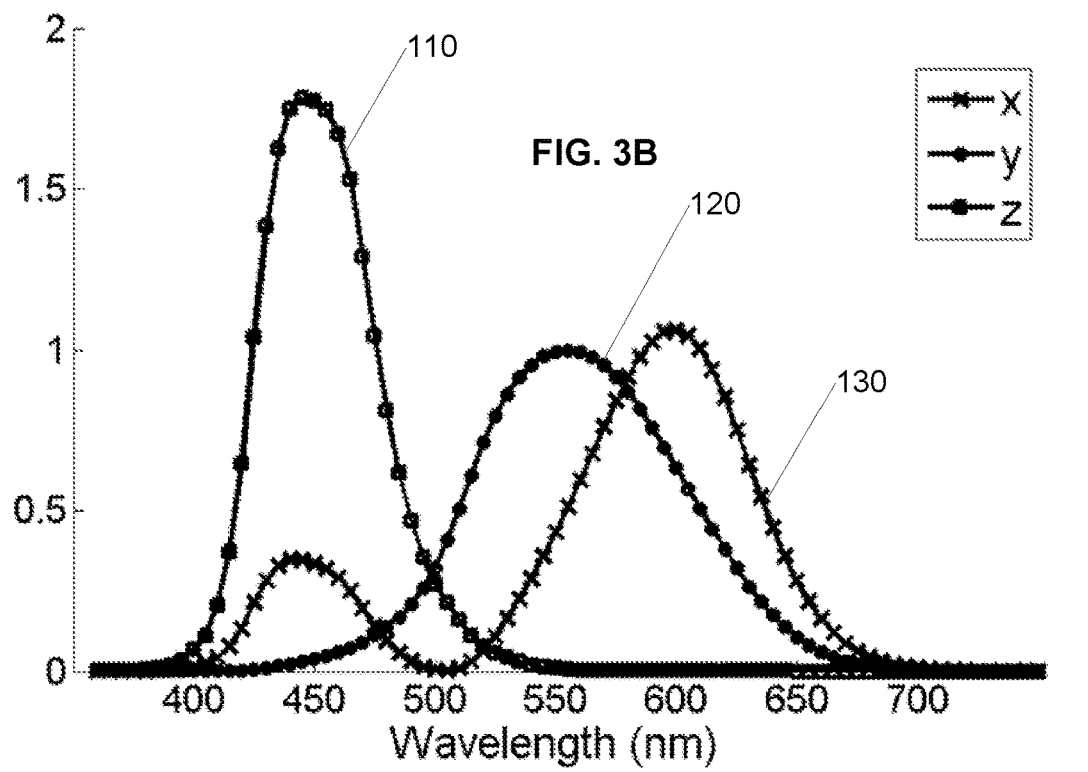
FIG. 3B is a graph diagram illustrating an example color matching for use with a hyperspectral imaging stack according to an embodiment of the invention.
Figure 3C:
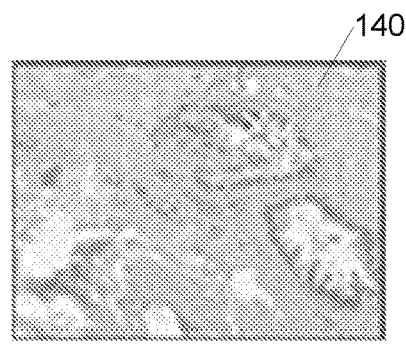
FIG. 3C is a block diagram illustrating an example hyperspectral image in XYZ color according to an embodiment of the invention.

FIG. 3B is a graph diagram illustrating an example color matching for use with a hyperspectral imaging stack according to an embodiment of the invention. In the illustrated embodiment, color matching functions can be applied to each digital image in the whole slide image spectral stack at a variety of wavelengths of light (110, 120 and 130) to generate a whole slide hyperspectral image 140 in XYZ color. FIG. 3C is a block diagram illustrating an example whole slide hyperspectral image 140 in XYZ color according to an embodiment of the invention.

Figure 3D:
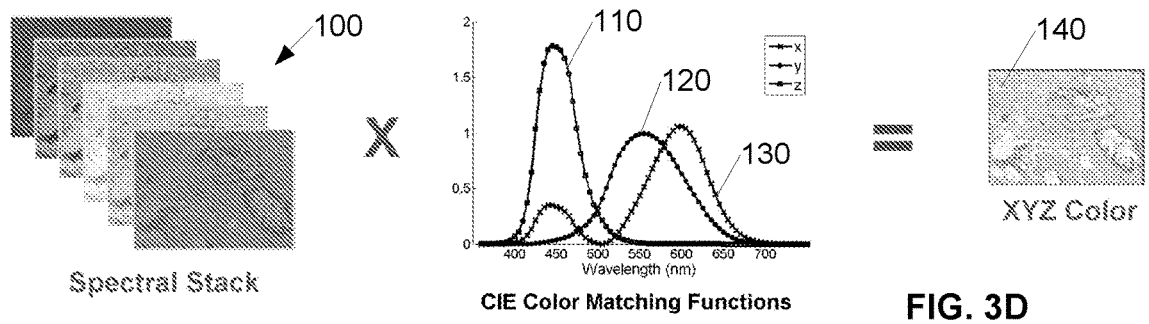
FIG. 3D is a flow diagram illustrating an example process for converting a hyperspectral image stack to a single XYZ color image according to an embodiment of the invention.

FIG. 3D is a flow diagram illustrating an example process for converting a whole slide hyperspectral image stack 100 to a single hyperspectral image 140 in XYZ color according to an embodiment of the invention. Initially, whole slide images for each different wavelength of light are captured by the hyperspectral imaging system to generate a hyperspectral image stack 100. Then color matching functions are applied to each digital image in the spectral stack 100 at a variety of wavelengths of light (110, 120, 130) to generate a whole slide hyperspectral digital image 140 of the entire specimen in XYZ color.

Figure 4A:
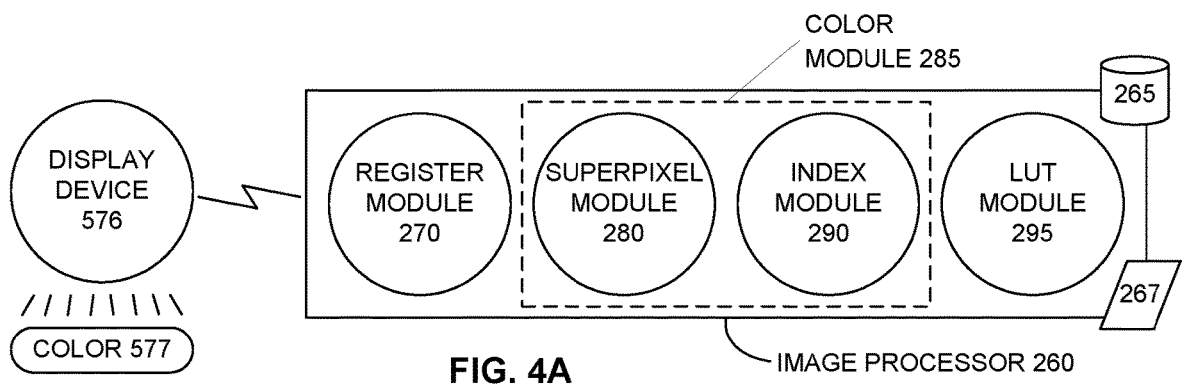
FIG. 4A is a block diagram illustrating an example image processor device according to an embodiment of the invention.

FIG. 4A is a block diagram illustrating an example image processor device 260 according to an embodiment of the invention. In the illustrated embodiment, the image processor device 260 is processor enabled device having a processor 267 and a non-transitory data storage area 265 for storing information and instructions that can be executed by the processor 267. For example, the data storage area 260 may store a plurality of hyperspectral XYZ images and a plurality of digital pathology RGB images and a plurality of instructions for processing such images. As shown in the illustrated embodiment, the image processor device 260 includes a register module 270, a superpixel module 280, an index module 290 and a LUT module 295. In one embodiment, the superpixel module 280 and the index module 290 may be combined into a color module 285. The image processor device 260 may also be communicatively coupled with an integral or external display device 576. In one embodiment, a color measurement device 577 may be configured to read color information from the display device 576 and translate the color information into one or more XYZ values.

The register module 270 is configured to register two digital images to each other. For example the register module 270 is configured to register a hyperspectral XYZ image to a digital pathology RGB image. The register module 270 registers two digital images by aligning the image data of the two images in X-Y to bring the two images into X-Y alignment, for example by pattern matching of features in the image data. The register module 260 also registers two digital images by adjusting the digital images so that they have common characteristics. For example, the register model 270 may evaluate and adjust image characteristics including image pixel size and spatial alignment of translation, rotation, and magnification. Additionally, the register module 270 may also account for optical distortions between the two separate systems, which can be detected at the pixel level.

The superpixel module 280 is configured to identify contiguous image pixels that have the same or similar color values and combine those pixels into a single superpixel. The superpixel module 280 is also configured to determine a color value for the superpixel by averaging the color values of all of the individual image pixels in the superpixel. Averaging is important to reduce noise due to possible measurement and registration errors. The average color value can be determined for a superpixel, for example, by summing the color values of the image pixels in the superpixel and dividing the sum by the number of pixels for that superpixel. The superpixel module 280 can advantageously identify a plurality of superpixels in a digital image and determine a color value for each of the plurality of superpixels.

The index module 290 is configured to identify individual image pixels that have the same or similar color values and assign these individual image pixels to one of a plurality of color indices. The index module 290 is also configured to determine a color value for each color index by averaging the color values of all of the individual image pixels in the respective color index. Averaging is important to reduce noise due to possible measurement and registration errors. The average color value can be determined for an index, for example, by summing the color values of the image pixels in the index and dividing the sum by the number of pixels for that index.

The LUT module 295 is configured to generate one or more lookup tables that correlate XYZ color values to RGB color values.

Figure 4B:
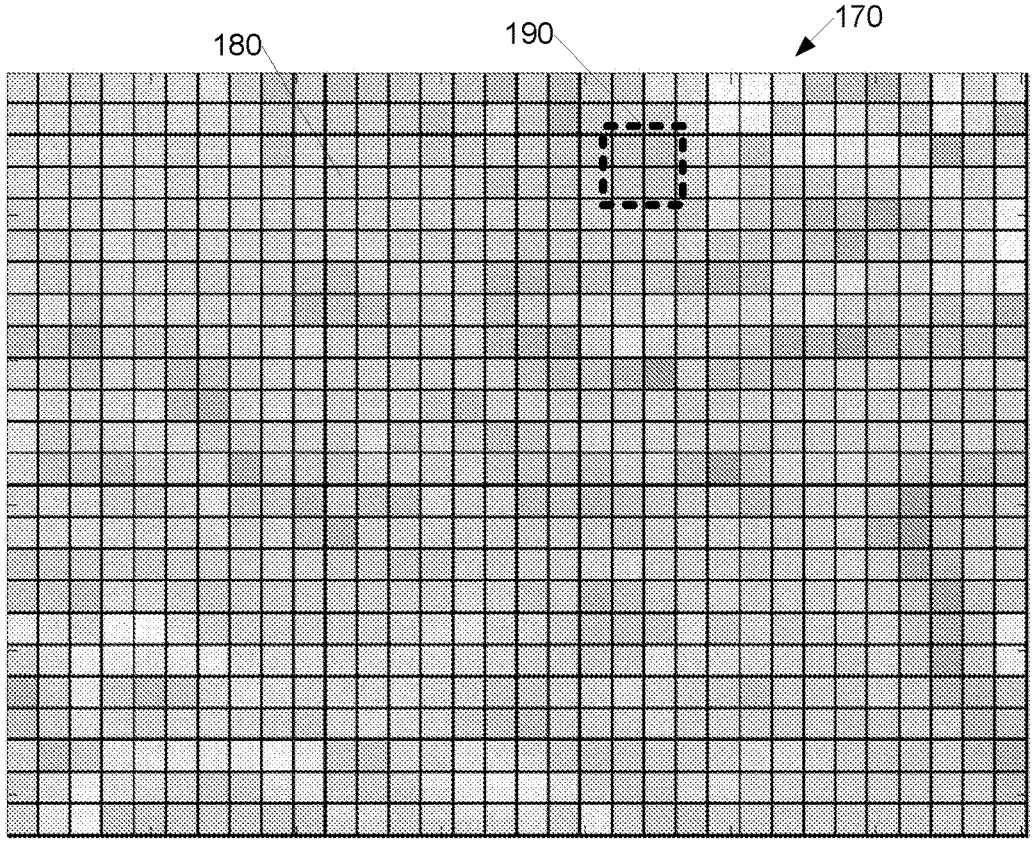
FIG. 4B is a block diagram illustrating example superpixels of a hyperspectral image in XYZ color according to an embodiment of the invention.

FIG. 4B is a block diagram illustrating an example registered whole slide image 170 according to an embodiment of the invention. In the illustrated embodiment, whole slide image 170 may be a hyperspectral image or a digital pathology image. During the registration process, image data from the hyperspectral digital image and the pathology digital image is analyzed to achieve X-Y alignment. For example, the image data may be analyzed to identify features in the image data that can be matched and aligned in order to register the hyperspectral digital image to the pathology digital image in X-Y. Advantageously, pattern matching can be used to associate common features between the hyperspectral digital image to the pathology digital image to facilitate X-Y alignment.

Additionally during the registration process, the image data for the hyperspectral digital image and the pathology digital image is converted to common characteristics. This is because the imaging hardware of the hyperspectral scanning system and the pathology scanning system is unlikely to produce identical digital image data with respect to, for example, the magnification and image pixel size in the digital image data. Accordingly, during the registration process, the image data for the hyperspectral digital image and the pathology digital image is adjusted to have common characteristics. For example, a magnification adjustment may be needed and an adjustment to a common image pixel size is nearly always needed. In the illustrated embodiment, image pixel 180 is an image pixel having the common image pixel size.

FIG. 5 is a flow diagram illustrating an example process for calibrating color values generated by a digital pathology scanning apparatus using a superpixel process according to an embodiment of the invention. Certain steps of the illustrated process may be carried out by an image processor device such as previously described with respect to FIG. 4A. Initially, in step 300 one or more test slides are prepared. A test slide is any type of slide that will be scanned by both the hyperspectral imaging system and the digital pathology imaging system and used for calibration/validation purposes. Accordingly, no special type of slide preparation is required to be a test slide and there are no special characteristics of a test slide. Any slide having any stains can be used as a test slide to calibrate a digital pathology scanning apparatus. This is a substantial deviation from all prior color calibration attempts and eliminates the problems of attempting to create a test slide or a test color sample. Using a slide prepared in the normal way with a specimen and stains also allows the scanning apparatus to be calibrated using actual stains as modified by their application to tissue that will be encountered during production scanning. This provides a significant advantage. Moreover, using multiple test slides can result a combined LUT that includes color values for multiple stains.

Additionally, in one embodiment, a registration grid can be overlayed on the slide—preferably over the portion of the slide that includes the sample. The registration grid, if present, can be later used as a marker in the hyperspectral digital image and the digital pathology digital image to register the hyperspectral digital image to the digital pathology digital image by aligning the image data in X-Y.

Next, in step 310 a hyperspectral image is scanned and stored. The hyperspectral image may be scanned as separate image tiles using tiling system hardware or the hyperspectral image may be scanned as a whole slide image using line scanning system hardware. Advantageously, the present color calibration and validation systems and methods are hardware agnostic.

After scanning, the native hyperspectral image includes one or more spectral stacks having a plurality of individual images that are each processed using color matching functions to generate a single digital image in XYZ color. Next, in step 320 a color digital pathology image is scanned and stored. The scanned digital pathology image is in RGB color. The digital pathology image may also be scanned as separate image tiles using a tiling system or the digital pathology image may be scanned as a whole slide image using a line scanning system. While there are advantages to using cameras with the same or very similar characteristics such as pixel size and pixel number in the hyperspectral imaging system and the digital pathology imaging system, these advantages primarily serve to simplify the image registration process and make the registration process robust.

Next in step 330, the hyperspectral image and the digital pathology image are registered to each other. Image registration includes X-Y alignment, for example by pattern matching, and conversion to common characteristics, for example, magnification and image pixel size. In some embodiments, the registration process includes generation of resampled image pixels (larger or smaller) to make the individual image pixel size from the separate scanning systems substantially the same. In some embodiments, the registration process may also include localized variations in translation to account for optical distortions.

Once the hyperspectral image and the digital pathology images are registered to each other, in step 340 the color groups in the hyperspectral image are determined. In a simple embodiment, each individual image pixel in the hyperspectral image is its own color group. However, this would result in significant noise because an individual image pixel is very small and consequently the sample size for each color is also very small. To reduce the noise, in step 340 contiguous individual image pixels having the same or very similar colors are combined into larger superpixels such as superpixel 190 shown in FIG. 4B. The larger the superpixel, the greater the sample size, which has the advantage of reduced noise. However, a disadvantage of including more pixels in a superpixel is that it reduces the range of colors across all superpixels. Once a superpixel has been identified, the color of the superpixel determines a color group. In one embodiment, the color values of all image pixels included in the superpixel are averaged together to determine an average color value and that average color value is determined to be the color for that color group, as shown in step 350.

Advantageously, the color groups in the hyperspectral image cover every image pixel in the hyperspectral image and each color group has an X-Y perimeter. Accordingly, because the hyperspectral image and the digital pathology image have been registered to each other, the X-Y perimeters of the color groups from the hyperspectral image can be applied to the digital pathology image as shown in step 360 to associate the individual image pixels of the digital pathology image into the same color groups as the hyperspectral image. Accordingly, the color values of the individual image pixels of each color group in the digital pathology image can be similarly averaged in step 370 to determine an average color value for each color group in the digital pathology image.

Once the average color values for the various color groups in the hyperspectral image and the average color values for the same color groups in the digital pathology image have been established, these color values can be correlated to each other in a lookup table having XYZ color values associated with their correlated RGB color values, as shown in step 380. In one embodiment, the lookup table can be embedded in a data structure that houses the digital pathology image. In one embodiment, the correlation of the XYZ color data to the RGB color data can be included in the digital pathology image data structure as part of an International Color Consortium (ICC) profile. For example, as previously mentioned, the lookup table can be embedded in the digital pathology image data structure or alternatively, the information in the lookup table can be converted into a mathematical model or formula or a set of executable instructions and the model or formula or set of instructions can be embedded in the digital pathology image data structure. An advantage of embedding the model or formula or set of instructions is that the data size of the model or formula or set of instructions is smaller and thereby reduces the size of the digital pathology image data structure. Another advantage is that the model or formula or set of instructions functions to average out minor differences and discrepancies in the correlation of the XYZ color data to the RGB color data, which may be introduced, for example, due to metamerism. Metamerism is when two colors that are not actually the same (i.e., they reflect different wavelengths of light) appear to be the same under certain lighting conditions.

In one embodiment, a single combined lookup table is generated over time from a plurality of slides having a plurality of different stains. Advantageously, a single combined lookup table can be generated and optimized over time such that the single combined lookup table can be used for any type of digital pathology slide with any type of staining profile.

FIG. 6 is a flow diagram illustrating an example process for validating color values generated by a digital pathology scanning apparatus using a superpixel process according to an embodiment of the invention. Certain steps of the illustrated process may be carried out by an image processor device such as previously described with respect to FIG. 4A. In the illustrated embodiment, a test slide is initially prepared in step 400. As previously discussed, the test slide can be any slide prepared in the normal fashion using a specimen and zero or more stains. Next, in step 410 a lookup table is generated, for example using the process previously described with respect to FIG. 5. The lookup table may contain color values such as those shown in the Hyperspectral XYZ column and the associated Digital Pathology RGB column of Table 1 below, where each row represents the same color group (e.g., a superpixel) in the hyperspectral digital image and the digital pathology digital image.

TABLE 1

| SUPER-PIXEL | HYPERSPECTRAL XYZ | DIGITAL PATHOLOGY RGB | DIGITAL PATHOLOGY XYZ |
|---|---|---|---|
| 1 | 0.777, 0.631, 0.551 | 225, 147, 169 | 0.770, 0.625, 0.556 |
| 2 | 0.743, 0.574, 0.500 | 219, 130, 154 | 0.750, 0.570, 0.510 |
| 3 | 0.712, 0.426, 0.454 | 213, 117, 140 | 0.719, 0.431, 0.450 |
| 4 | 0.683, 0.485, 0.413 | 208, 105, 128 | 0.678, 0.481, 0.418 |

Table 1 illustrates a correlation of hyperspectral image data in XYZ color values to digital pathology image data in RGB color values to digital pathology image data in XYZ color values.

Next, in step 420 the XYZ values of the digital pathology image are determined. This can be done in at least two ways. A first way is that the XYZ values for the digital pathology image can be calculated from the RGB values of the digital pathology image—for example using a lookup table or a formula. A second way is that the digital pathology image can be presented on a display and the colors emitted from the display can be measured using a color measurement device (e.g., colorimeter or spectrophotometer) that measures color in XYZ value.

Finally, in step 430 the calculated or measured XYZ value for a particular region (e.g. a superpixel) of the digital pathology image is compared to the hyperspectral image XYZ value for the same region. In this fashion, the color information generated by digital pathology apparatus and presented on a display screen can be validated.

Figure 7A:
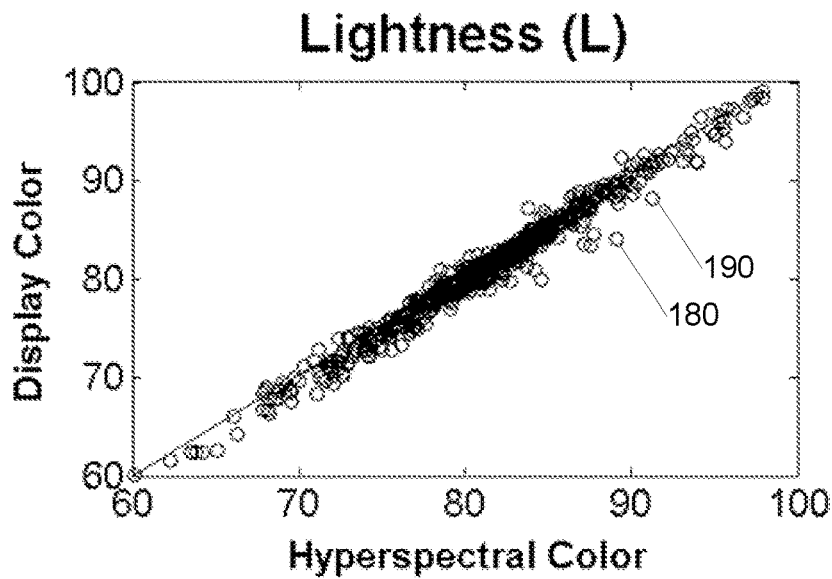
FIGS. 7A, 7B and 7C are a graph diagrams illustrating example comparisons of color values of a specimen scanned by a hyperspectral imaging system versus superpixeling color values of the same specimen scanned by a digital pathology imaging system and presented on a display and measured by a color measurement device according to an embodiment of the invention.
Figure 7B:
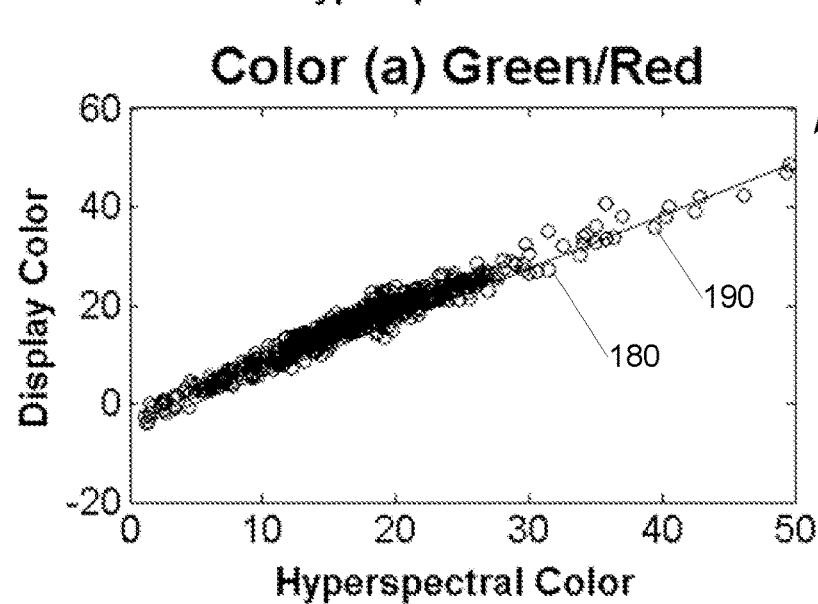
Figure 7C:
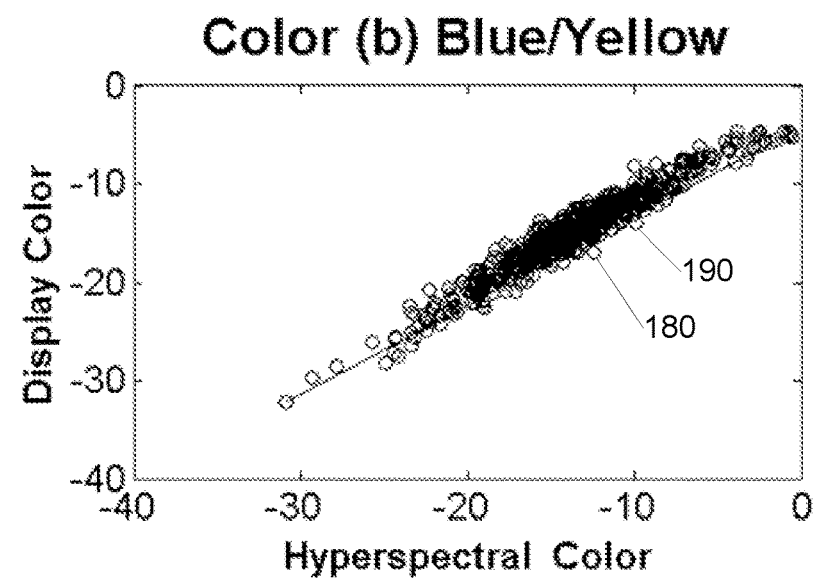

FIGS. 7A, 7B and 7C are a graph diagrams illustrating example comparisons of color values of a specimen scanned by a hyperspectral imaging system versus superpixeling color values of the same specimen scanned by a digital pathology imaging system according to an embodiment of the invention. The XYZ color values from the digital pathology imaging system were obtained by presenting the digital slide image on a display and measuring a superpixel region with a color measurement device. Alternatively, because a superpixel region can be very small and therefore difficult to measure with a color measurement device, the color value for the superpixel may be used to fill up the entire display with a single color and then measuring a region with a color measurement device. As demonstrated by the graph, the color values measured as coming off of the display screen were extremely close to the true color values as measured by the hyperspectral imaging system, with an average difference of 2.18, which is less than one Just Noticeable Difference.

In FIG. 7A, graph 200 shows a comparison of the system hyperspectral value for lightness to the digital pathology display value for lightness. Similarly, in FIG. 7B, graph 220 shows a comparison of the system hyperspectral value for green/red to the digital pathology display value for green/red. Similarly, in FIG. 7C, graph 240 shows a comparison of the system hyperspectral value for blue/yellow to the digital pathology display value for blue/yellow. Additionally, in each of the graphs 200, 220 and 240, it is evident that there are a very large number of individual comparisons. Notably, each individual comparison corresponds to a separate superpixel. After the registration process, although the number of image pixels in the hyperspectral image and the digital pathology image is also very large, the consequence of having large number of superpixels is that the sample size (i.e., number of image pixels) for each superpixel is small and therefore noise is increased in the data set.

Figure 8:
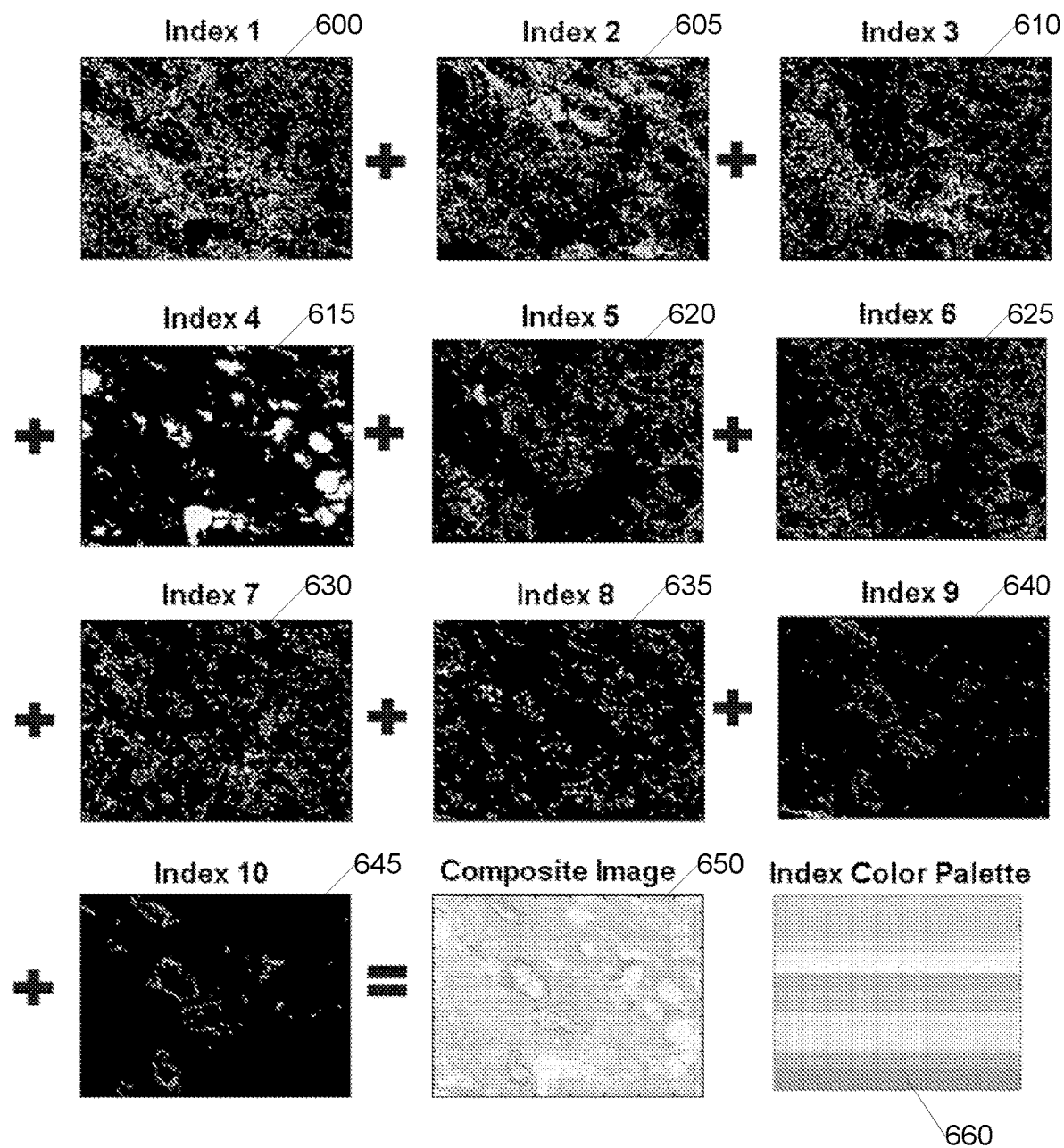
FIG. 8 is a block diagram illustrating an example set of pixel groups that form a composite XYZ image according to an embodiment of the invention.

FIG. 8 is a block diagram illustrating an example set of pixel groups that form a composite XYZ image 650 according to an embodiment of the invention. In the illustrated embodiment, there are ten indices, namely index 1, 600, index 2, 605, index 3, 610, index 4, 615, index 5 620, index 6 625, index 7 630, index 8 635, index 9 640 and index 10 645. Each of the indices represents a separate color group for the underlying digital image. When combined together, the ten indices result in the composite image 650. The index color palette 660 represents each of the color values corresponding to each individual index.

As can be seen in the individual index images, each index image represents a scattering of all image pixels in the underlying digital image that have the same color value within a certain threshold. The indexing process can be applied to either the XYZ digital image or the RGB digital image. Advantageously, the indexing process analyzes the color values for each pixel in the digital image and identifies all pixels, regardless of X-Y location that belong to a single color value. In the illustrated embodiment, an entire digital pathology digital image, whether created by a hyperspectral imaging system or a pathology imaging system can be indexed into about ten (10) color values. A significant advantage of indexing all image pixels in a digital image into a relatively small number of color values is that the sample size for each color value is significantly increased, which significantly reduces noise. Another advantage of indexing all image pixels in a digital image into a relatively small number of color values is that it provides the widest range of average color values from the smallest number of indices.

Figure 9:
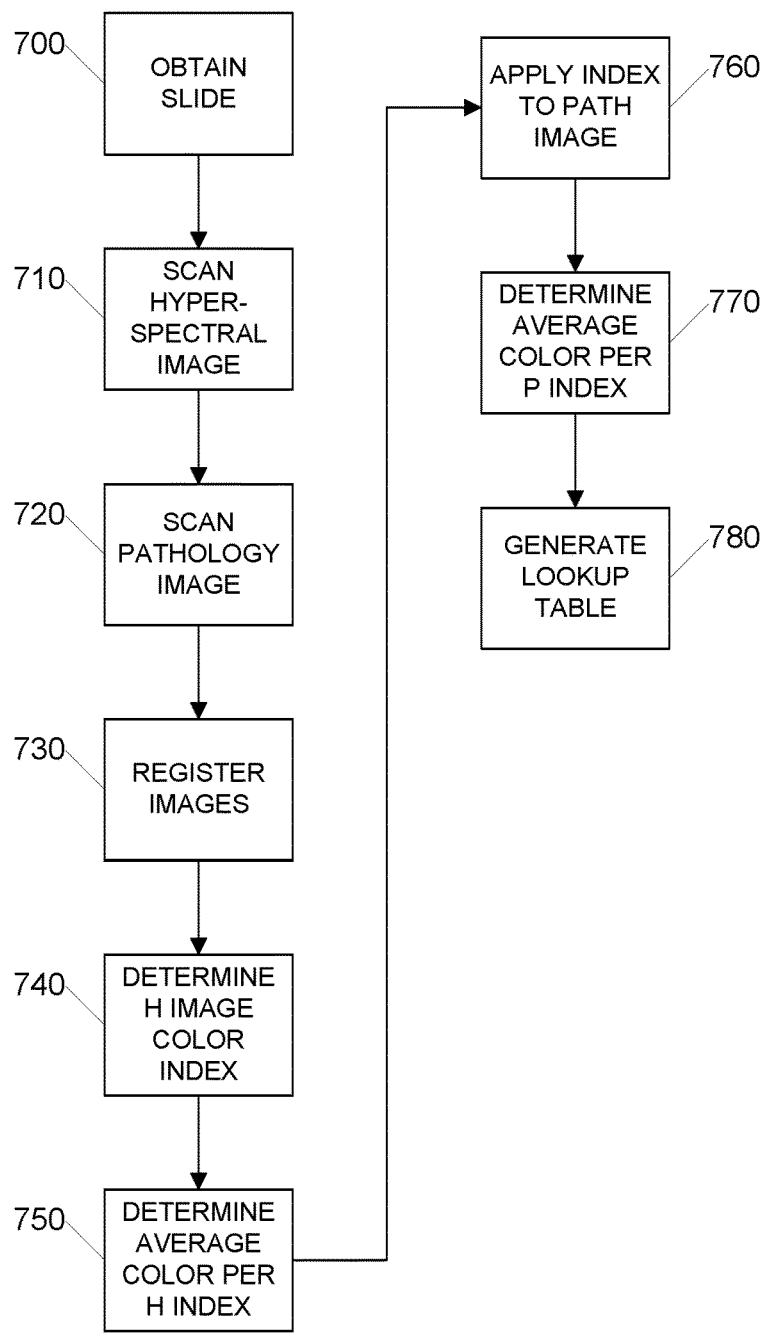
FIG. 9 is a flow diagram illustrating an example process for calibrating color values generated by a digital pathology scanning apparatus using an indexing process according to an embodiment of the invention.

FIG. 9 is a flow diagram illustrating an example process for calibrating color values generated by a digital pathology scanning apparatus using an indexing process according to an embodiment of the invention. Certain steps of the illustrated process may be carried out by an image processor device such as previously described with respect to FIG. 4A. Initially, in step 700 a slide is obtained. As previously discussed, any type of slide with a specimen having zero or more stains is suitable. Next, in step 710 a hyperspectral image is scanned and stored as an XYZ image. As previously discussed, the hyperspectral image may be scanned as separate image tiles using any type of scanning system hardware. Next, in step 720 a color digital pathology image is scanned and stored as an RGB image.

Next in step 730, the hyperspectral image and the digital pathology image are registered to each other as previously described. Image registration includes X-Y alignment and conversion to common characteristics such as image pixel size. Once the hyperspectral image and the digital pathology images are registered to each other, in step 740 the hyperspectral image is indexed to identify a set of colors into which every image pixel in the hyperspectral image can be allocated. In a simple embodiment, the indexing process receives an index value (i.e., the total number of indices) and then sorts the individual pixels into that number of color groups in a fashion that minimizes the error values associated with allocating each pixel into an index that is defined by a color value that is not identical to the color value of the respective pixel being allocated to the index. For example, the index module 290 may be configured to use an index value of ten or fifteen or twenty for any digital image. In a more complex embodiment, the index module 290 may be configured to analyze the digital image data to determine an optimal index value that allocates each pixel into the smallest number of indices that minimizes the error value over the entire digital image.

Once all of the individual image pixels have been allocated to an index of the hyperspectral image, the color value of the respective index is determined by averaging the color values of all individual image pixels in the respective index to determine an average color value and that average color value is determined to be the color for that respective index of the hyperspectral image, as shown in step 750.

Advantageously, the combined indices in the hyperspectral image include every image pixel in the hyperspectral image. Accordingly, because the hyperspectral image and the digital pathology image have been registered to each other, each index from the hyperspectral image can be applied to the digital pathology image in step 760 in order to group together the same individual image pixels included in an index for the hyperspectral image in a corresponding index for the digital pathology image. This can be accomplished because the hyperspectral image and the digital pathology image were previously registered to each other and their respective image pixel sizes were adjusted to be the same.

Once all of the individual image pixels of the digital pathology image have been allocated to an index, the color value of each respective index of the digital pathology image is determined by averaging the color values of all individual image pixels in the respective index to determine an average color value and that average color value is determined to be the color for that respective index, as shown in step 770.

Once the average color values for the various indices in the hyperspectral image and the average color values for the same indices in the digital pathology image have been established, these color values can be correlated to each other in a lookup table having XYZ color values associated with their correlated RGB color values, as shown in step 780. In one embodiment, the lookup table can be embedded in a data structure that houses the digital pathology image. In one embodiment, the XYZ color data can be included in the digital pathology image data structure as part of an International Color Consortium (ICC) profile. As previously mentioned, the lookup table or mathematical model or formula or set of instructions can be embedded in the digital pathology image data structure.

As previously described, a single combined lookup table can advantageously be generated over time from a plurality of slides having a plurality of different stains. Advantageously, a single combined lookup table can be generated and optimized over time such that the single combined lookup table can be used for any type of digital pathology slide with any type of staining profile.

Figure 10:
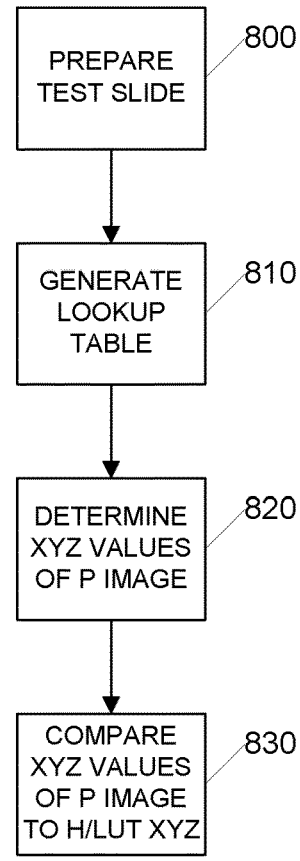
FIG. 10 is a flow diagram illustrating an example process for validating color values generated by a digital pathology scanning apparatus using an indexing process according to an embodiment of the invention.

FIG. 10 is a flow diagram illustrating an example process for validating color values generated by a digital pathology scanning apparatus using an indexing process according to an embodiment of the invention. Certain steps of the illustrated process may be carried out by an image processor device such as previously described with respect to FIG. 4A. Initially, a test slide is prepared in step 800. As previously discussed, the test slide can be any slide prepared in the normal fashion using a specimen and zero or more stains. Next, in step 810 a lookup table is generated, for example using the process previously described with respect to FIG. 9. The lookup table may contain color values such as those shown in the Hyperspectral XYZ column and the associated Digital Pathology RGB column of Table 2 below, where each row represents a single color value (i.e., index) in the hyperspectral digital image and the digital pathology digital image.

TABLE 2

| INDEX | HYPERSPECTRAL XYZ | | | DIGITAL PATHOLOGY RGB | | | DIGITAL PATHOLOGY XYZ | | |
|---|---|---|---|---|---|---|---|---|---|
| 1 | 0.702 | 0.656 | 0.646 | 225 | 208 | 225 | 0.700 | 0.652 | 0.649 |
| 2 | 0.654 | 0.594 | 0.619 | 218 | 197 | 219 | 0.648 | 0.583 | 0.618 |
| 3 | 0.745 | 0.716 | 0.677 | 230 | 217 | 230 | 0.744 | 0.713 | 0.678 |
| 4 | 0.891 | 0.921 | 0.764 | 248 | 247 | 248 | 0.900 | 0.931 | 0.778 |
| 5 | 0.564 | 0.494 | 0.556 | 206 | 180 | 208 | 0.566 | 0.489 | 0.560 |
| 6 | 0.603 | 0.558 | 0.591 | 211 | 192 | 215 | 0.606 | 0.553 | 0.596 |
| 7 | 0.787 | 0.780 | 0.707 | 235 | 226 | 236 | 0.789 | 0.780 | 0.710 |
| 8 | 0.832 | 0.844 | 0.735 | 240 | 235 | 241 | 0.837 | 0.845 | 0.741 |
| 9 | 0.457 | 0.424 | 0.506 | 184 | 168 | 197 | 0.460 | 0.419 | 0.509 |
| 10 | 0.382 | 0.324 | 0.450 | 174 | 147 | 185 | 0.389 | 0.319 | 0.450 |

Table 2 illustrates a correlation of hyperspectral image data in XYZ color values to digital pathology image data in RGB color values to digital pathology image data in XYZ color values.

Next, in step 820 the XYZ values of the digital pathology image are determined. As previously discussed, this can be done by calculating the XYZ values for the digital pathology image based on the RGB values of the digital pathology image or by presenting the color value on the entire display and measuring the color emitted from the display using a color measurement device that measures color in XYZ value.

Finally, in step 830 the calculated or measured XYZ value for a particular color value (e.g. an index) of the digital pathology image is compared to the hyperspectral image XYZ value for the same index. In this fashion, the color information generated by digital pathology apparatus and presented on a display screen can be validated against the true color as measured by the hyperspectral imaging system.

Figure 11A:
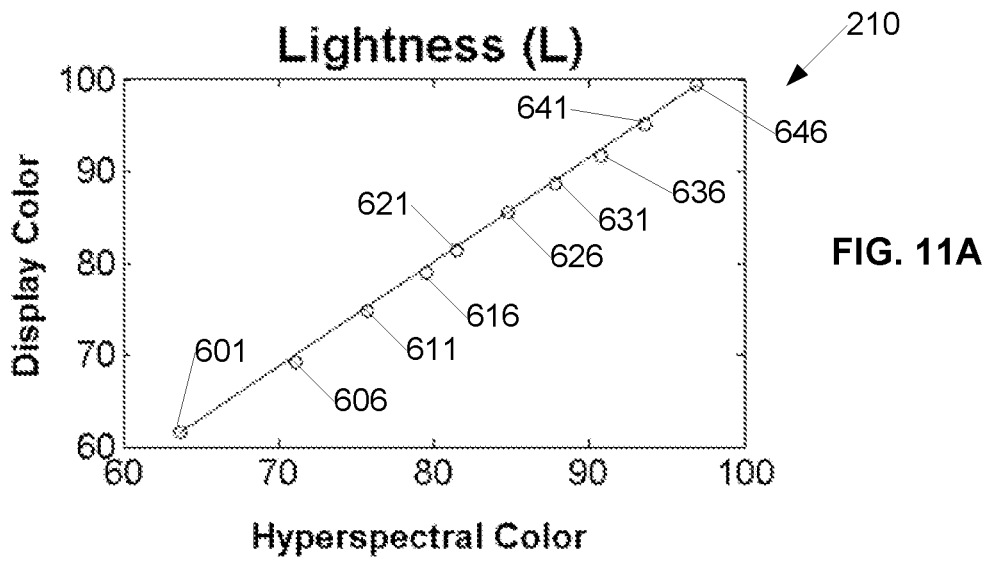
FIGS. 11A, 11B and 11C are graph diagrams illustrating example comparisons of color values of a specimen scanned by a hyperspectral imaging system versus indexing color values of the same specimen scanned by a digital pathology imaging system and presented on a display and measured by a color measurement device according to an embodiment of the invention.
Figure 11B:
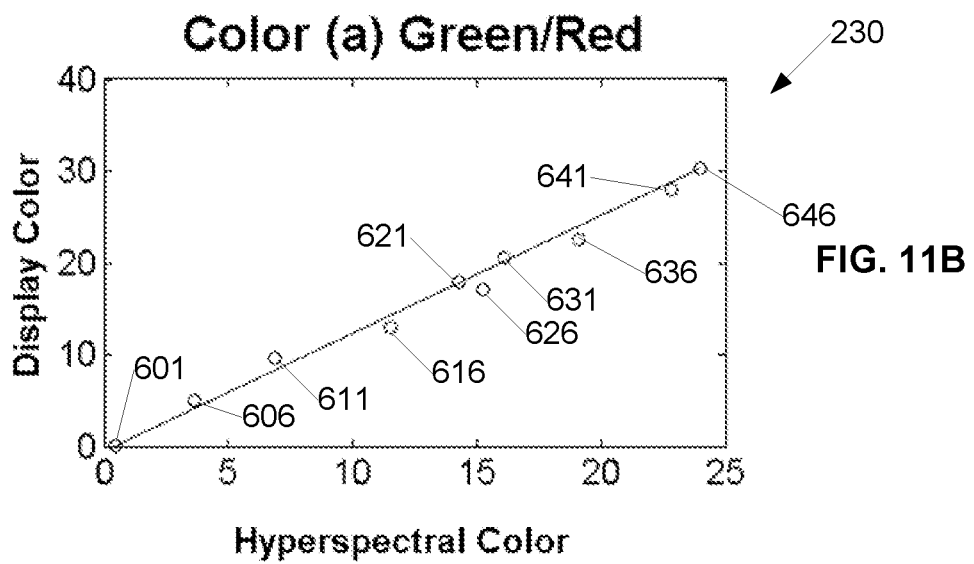
Figure 11C:
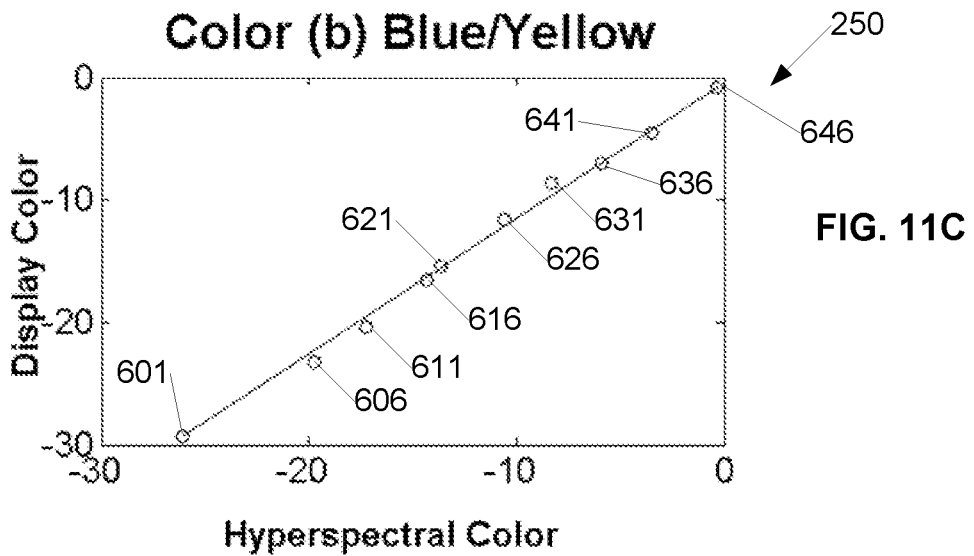

FIGS. 11A, 11B and 11C are a graph diagrams illustrating example comparisons of indexed color values of a specimen scanned by a hyperspectral imaging system versus indexed color values of the same specimen scanned by a digital pathology imaging system according to an embodiment of the invention. The XYZ color values from the digital pathology imaging system were obtained by presenting each indexed color value on the entire display and measuring a portion of the display with a color measurement device. As demonstrated by the graphs, the color values measured as coming off of the display screen were extremely close to the true color values as measured by the hyperspectral imaging system, with an average difference that is less than one Just Noticeable Difference.

In FIG. 11A, graph 210 shows a comparison of the system hyperspectral value for lightness to the digital pathology display value for lightness. Similarly, in FIG. 7B, graph 230 shows a comparison of the system hyperspectral value for green/red to the digital pathology display value for green/red. Similarly, in FIG. 7C, graph 250 shows a comparison of the system hyperspectral value for blue/yellow to the digital pathology display value for blue/yellow. Additionally, in each of the graphs 210, 230 and 250, it is evident that there are a very small number of individual comparisons. Notably, each individual comparison corresponds to a separate index. Advantageously, having a small number of indices results in a large number of pixels in each index, which consequently reduces the noise in the data set. When FIGS. 11A, 11B and 11C are compared to FIGS. 7A, 7B and 7C, there are fewer measurements, but the scatter due to noise is much less. This demonstrates the advantage of having a very large number of image pixels in each index that form the basis for determining the average color.

Figure 12A:
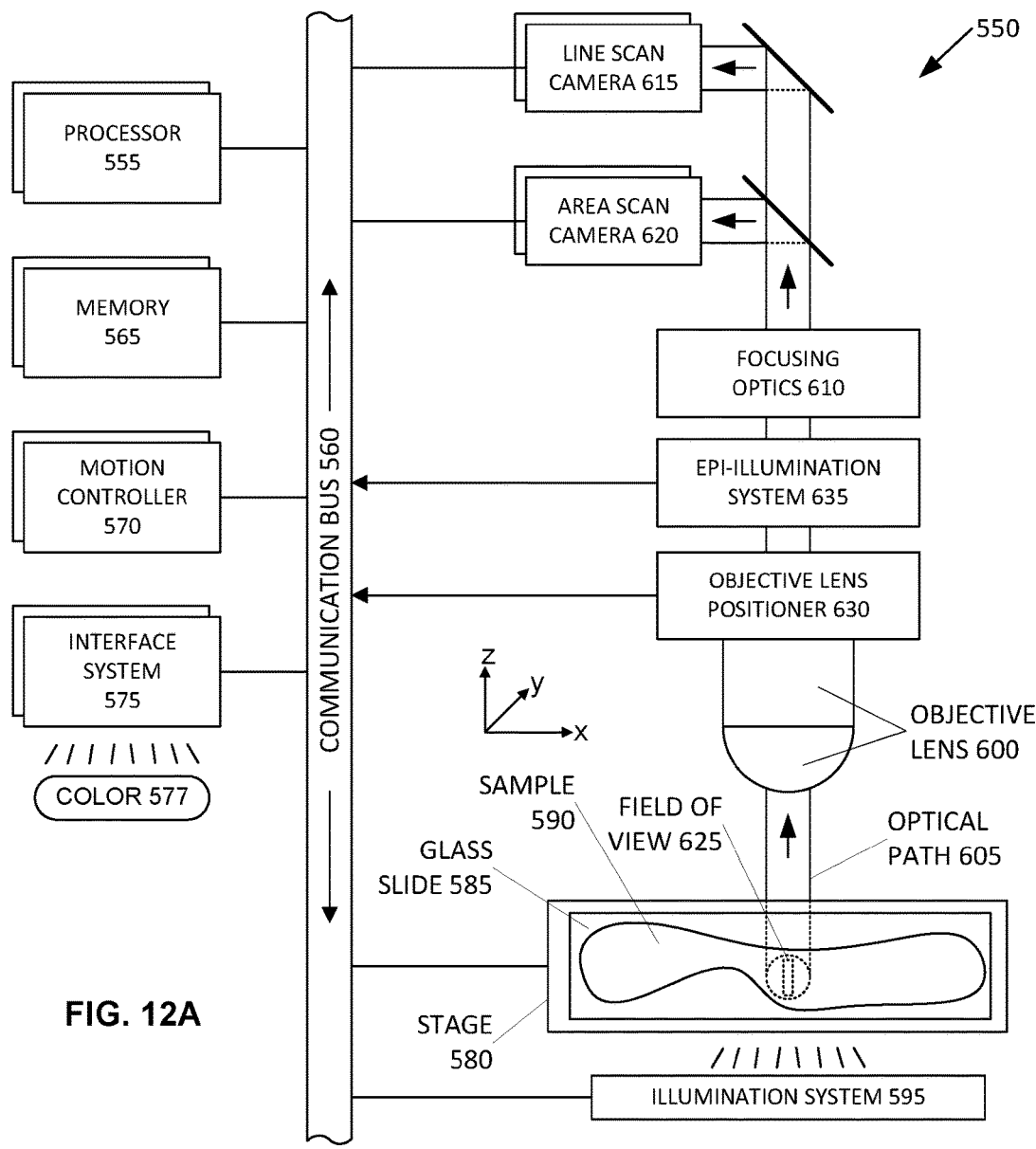
FIG. 12A is a block diagram illustrating an example processor enabled device 550 that may be used in connection with various embodiments described herein.

FIG. 12A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to herein as a scanner system or a scanning system) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description that follows, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and persistent computer-readable storage mediums that store the data and instructions, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium) or external devices such as an image server system, an operator station, a user station, and an administrative server system that are connected to the scanner system 550 via a network (not shown). In one embodiment, a color measurement device 577 may be configured to read color information from the user interface 575 and translate the color information into one or more XYZ values.

The illumination system 595 is configured to illuminate a portion of the sample 590. The illumination system may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In one embodiment, the illumination system 595 illuminates the sample 590 in transmission mode such that the line scan camera 615 and/or area scan camera 620 sense optical energy that is transmitted through the sample 590. Alternatively, or in combination, the illumination system 595 may also be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In one embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple florescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise XY movement under control of the processor 555 or the motion controller 570. The movable stage may also be configured for movement in Z under control of the processor 555 or the motion controller 570. The moveable stage is configured to position the sample in a desired location during image data capture by the line scan camera 615 and/or the area scan camera. The moveable stage is also configured to accelerate the sample 590 in a scanning direction to a substantially constant velocity and then maintain the substantially constant velocity during image data capture by the line scan camera 615. In one embodiment, the scanner system 550 may employ a high precision and tightly coordinated XY grid to aid in the location of the sample 590 on the movable stage 580. In one embodiment, the movable stage 580 is a linear motor based XY stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA or RNA or protein that is deposited on any type of slide or other substrate, including any and all samples commonly known as a microarrays. The sample 590 may be a microtiter plate, for example a 96-well plate. Other examples of the sample 590 include integrated circuit boards, electrophoresis records, petri dishes, film, semiconductor materials, forensic materials, or machined parts.

Objective lens 600 is mounted on the objective positioner 630 which, in one embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall scanning system 550 operation.

In one embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, etc. The objective lens 600 combined with focusing optics 610 provides the total magnification for the scanning system 550. In one embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays, for example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored a portion of the memory 565 and processed by the processor 555 to generate a contiguous digital image of at least a portion of the sample 590. The contiguous digital image can be further processed by the processor 555 and the revised contiguous digital image can also be stored in the memory 565.

In an embodiment with two or more line scan cameras 615, at least one of the line scan cameras 615 can be configured to function as a focusing sensor that operates in combination with at least one of the line scan cameras that is configured to function as an imaging sensor. The focusing sensor can be logically positioned on the same optical path as the imaging sensor or the focusing sensor may be logically positioned before or after the imaging sensor with respect to the scanning direction of the scanner system 550. In such an embodiment with at least one line scan camera 615 functioning as a focusing sensor, the image data generated by the focusing sensor is stored a portion of the memory 565 and processed by the one or more processors 555 to generate focus information to allow the scanner system 550 to adjust the relative distance between the sample 590 and the objective lens 600 to maintain focus on the sample during scanning.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In one embodiment, computer-executable instructions (e.g., programmed modules and software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly, for example via a network (not shown).

Figure 12B:
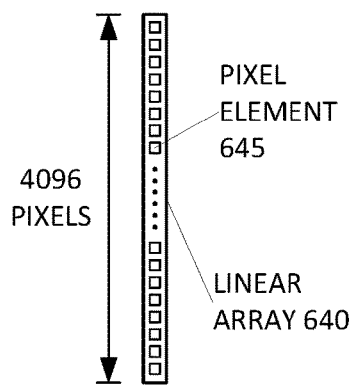
FIG. 12B is a block diagram illustrating an example line scan camera having a single linear array.

FIG. 12B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

Figure 12C:
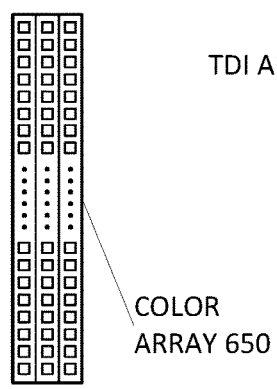
FIG. 12C is a block diagram illustrating an example line scan camera having three linear arrays.

FIG. 12C illustrates a line scan camera having three linear arrays, each of which may be implemented as a CCD array. The three linear arrays combine to form a color array 650. In one embodiment, each individual linear array in the color array 650 detects a different color intensity, for example red, green, or blue. The color image data from each individual linear array in the color array 650 is combined to form a single field of view 625 of color image data.

Figure 12D:
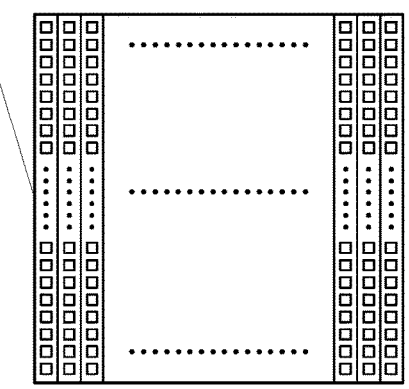
FIG. 12D is a block diagram illustrating an example line scan camera having a plurality of linear arrays.

FIG. 12D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays, for example common formats of TDI line scan cameras include 24, 32, 48, 64, 96, 120 and even more linear arrays.

EXAMPLE EMBODIMENTS

The disclosure of the present application may be embodied in a system comprising a non-transitory computer readable medium configured to store data and executable programmed modules; at least one processor communicatively coupled with the non-transitory computer readable medium and configured to execute instructions stored thereon; a register module stored in the non-transitory computer readable medium and configured to be executed by the processor, the register module configured to obtain a first digital image of a specimen in XYZ color, the first digital image having a plurality of image pixels having a first image pixel size, obtain a second digital image of the specimen in RGB color, the second digital image having a plurality of image pixels having a second image pixel size, convert the first digital image and the second digital image to a common image pixel size, and align the converted image pixels of the first digital image with corresponding converted image pixels of the second digital image. Such a system may be implemented as a processor enabled device such as the digital imaging device or the image processing device previously described with respect to FIGS. 4A and 12A-12D.

The disclosure of the present application may also be embodied in a system comprising a non-transitory computer readable medium configured to store data and executable programmed modules; at least one processor communicatively coupled with the non-transitory computer readable medium and configured to execute instructions stored thereon; a register module stored in the non-transitory computer readable medium and configured to be executed by the processor, the register module configured to: obtain a first digital image of a specimen in XYZ color, the first digital image having a plurality of image pixels having a first image pixel size, obtain a second digital image of the specimen in RGB color, the second digital image having a plurality of image pixels having a second image pixel size, align image data of the first digital image with corresponding image data of the second digital image, and convert the first digital image and the second digital image to a common image pixel size, wherein the converted image pixels of the first digital image are aligned with corresponding converted image pixels of the second digital image; a look up table module stored in the non-transitory computer readable medium and configured to be executed by the processor, the look up table module configured to: generate a look up table to associate the XYZ color values of a plurality of converted image pixels of the first digital image with the RGB color values of a plurality of corresponding converted image pixels of the second digital image. Such a system may be implemented as a processor enabled device such as the digital imaging device or the image processing device previously described with respect to FIGS. 4A and 12A-12D.

The disclosure of the present application may be embodied in a system comprising a non-transitory computer readable medium configured to store data and executable programmed modules; at least one processor communicatively coupled with the non-transitory computer readable medium and configured to execute instructions stored thereon; a register module stored in the non-transitory computer readable medium and configured to be executed by the processor, the register module configured to: obtain a first digital image of a specimen in XYZ color, the first digital image having a plurality of image pixels having a first image pixel size, obtain a second digital image of the specimen in RGB color, the second digital image having a plurality of image pixels having a second image pixel size, align image data of the first digital image with corresponding image data of the second digital image, and convert the first digital image and the second digital image to a common image pixel size, wherein the converted image pixels of the first digital image are aligned with corresponding converted image pixels of the second digital image; a color module stored in the non-transitory computer readable medium and configured to be executed by the processor, the color module configured to: identify a first set of image pixels in the first digital image, wherein each image pixel in the first set of image pixels in the first digital image has substantially a same XYZ color value, determine an average XYZ color value for the first set of image pixels in the first digital image, identify a second set of image pixels in the second digital image, wherein each image pixel in the second set of image pixels in the second digital image corresponds to an image pixel in the first set of image pixels in the first digital image, and determine an average RGB color value for the second set of image pixels in the second digital image; a look up table module stored in the non-transitory computer readable medium and configured to be executed by the processor, the look up table module configured to: generate a look up table to associate the average XYZ color value of the first set of image pixels in the first digital image with the average RGB color value of the corresponding second set of image pixels in the second digital image. Such a system may be implemented as a processor enabled device such as the digital imaging device or the image processing device previously described with respect to FIGS. 4A and 12A-12D.

Any of the three system embodiments described above may further embody wherein each of the image pixels in the first set of image pixels in the first digital image is contiguous with at least one other image pixel in the first set of image pixels in the first digital image.

Alternatively, any of the three system embodiments described above may further embody wherein at least some of the image pixels in the first set of image pixels in the first digital image are not contiguous, and furthermore, wherein the color module is further configured to identify a plurality of first sets of image pixels in the first digital image, wherein each image pixel in a first set of image pixels in the first digital image has substantially a same XYZ color value.

The disclosure of the present application may also be embodied in a technical system comprising a non-transitory computer readable medium configured to store executable programmed modules and at least one processor communicatively coupled with the non-transitory computer readable medium configured to execute instructions to perform steps comprising: scanning a specimen using a hyperspectral imaging system to generate a first digital image of the specimen in XYZ color; scanning the same specimen using a digital pathology imaging system to generate a second digital image of the specimen in RGB color; registering the first digital image to the second digital image to align the image data in the first digital image and the second digital image; generating a lookup table that associates the XYZ color of the first digital image and the RGB color of the second digital image. Such a system may be implemented as a processor enabled device such as the digital imaging device or the image processing device previously described with respect to FIGS. 4A and 12A-12D.

This system embodiment may further include providing XYZ color data to a display module for presentation of the second digital image on a display.

This system embodiment may further include storing the XYZ color data as part of the second digital image.

This system embodiment may further include using pattern matching to register the first digital image to the second digital image.

This system embodiment may further include overlaying a grid on the specimen prior to creating the first and second digital images and using the grid in the first and second digital images to register the first digital image to the second digital image.

This system embodiment may further include combining pixels in one or more of the first digital image and the second digital image to cause the pixel size in the first digital image to be substantially the same as the pixel size in the second digital image.

This system embodiment may further include generating a single lookup table for a single stain.

This system embodiment may further include generating a single lookup table for a plurality of stains.

The disclosure of the present application may also be embodied in a technical system comprising a non-transitory computer readable medium configured to store executable programmed modules and at least one processor communicatively coupled with the non-transitory computer readable medium configured to execute instructions to perform steps comprising: obtaining a first digital image of a specimen scanned by a first imaging system to generate the first digital image of the specimen in XYZ color, the first digital image having a plurality of image pixels having a first image pixel size; obtaining a second digital image of the specimen scanned by a second imaging system to generate the second digital image of the specimen in RGB color, the second digital image having a plurality of image pixels having a second image pixel size; registering the first digital image to the second digital image to align the image data in the first digital image and the second digital image; presenting the second digital image on a display; using a color measurement device to measure the XYZ values of the color presented on the display in a first region; and comparing the measured XYZ values of the first region to the XYZ values of the first digital image for the first region to validate the digital pathology system. Such a system may be implemented as a processor enabled device such as the digital imaging device or the image processing device previously described with respect to FIGS. 4A and 12A-12D.

The disclosure of the present application may also be embodied in a method comprising: obtaining a first digital image of a specimen scanned by a first imaging system to generate the first digital image of the specimen in XYZ color, the first digital image having a plurality of image pixels having a first image pixel size, obtaining a second digital image of the specimen scanned by a second imaging system to generate the second digital image of the specimen in RGB color, the second digital image having a plurality of image pixels having a second image pixel size, generating a lookup table to associate the XYZ color of the first digital image and the RGB color of the second digital image. Such a method may be implemented by a system such as the digital imaging device or the image processing device previously described with respect to FIGS. 4A and 12A-12D.

This method embodiment may further include aligning image data in the first digital image with image data in the second digital image; and generating a lookup table to associate the XYZ color of the first digital image with the corresponding RGB color of the second digital image in accordance with said alignment.

This method embodiment may further include, wherein the first digital image comprises a plurality of image pixels having a first image pixel size and the second digital image comprises a plurality of image pixels having a second image pixel size, converting the image pixels of the first digital image and the image pixels of the second digital image to a common image pixel size, and aligning the image pixels of the converted first digital image with corresponding image pixels of the converted second digital image.

This method embodiment may further include identifying a first set of image pixels in the first digital image, wherein each image pixel in the first set of image pixels in the converted first digital image has substantially a same XYZ color value; determining an average XYZ color value for the first set of image pixels in the converted first digital image; identifying a second set of image pixels in the converted second digital image, wherein each image pixel in the second set of image pixels in the converted second digital image corresponds to an image pixel in the first set of image pixels in the converted first digital image; determining an average RGB color value for the second set of image pixels in the converted second digital image, and generating a lookup table to associate the average XYZ color value for the first set of image pixels in the converted first digital image with the corresponding average RGB color value of the second set of image pixels in the converted second digital image.

The disclosure of the present application may also be embodied in a method comprising: obtaining a first digital image of a specimen scanned by a first imaging system to generate the first digital image of the specimen in XYZ color, the first digital image having a plurality of image pixels having a first image pixel size, obtaining a second digital image of the specimen scanned by a second imaging system to generate the second digital image of the specimen in RGB color, the second digital image having a plurality of image pixels having a second image pixel size, aligning image data in the first digital image with image data in the second digital image; and generating a lookup table to associate the XYZ color of the first digital image with the corresponding RGB color of the second digital image in accordance with said alignment. Such a method may be implemented by a system such as the digital imaging device or the image processing device previously described with respect to FIGS. 4A and 12A-12D.

This method embodiment may further include, wherein the first digital image comprises a plurality of image pixels having a first image pixel size and the second digital image comprises a plurality of image pixels having a second image pixel size, converting the first digital image and the second digital image to a common image pixel size, and aligning the converted image pixels of the first digital image with corresponding converted image pixels of the second digital image.

This method embodiment may further include identifying a plurality of first sets of image pixels in the converted first digital image, wherein each image pixel in each set of image pixels in the plurality of first sets of image pixels in the converted first digital image has substantially a same XYZ color value; determining an average XYZ color value for each set of image pixels in the plurality of first sets of image pixels in the converted first digital image; identifying a corresponding plurality of second sets of image pixels in the converted second digital image, wherein each image pixel in each set of image pixels in the plurality of second sets of image pixels in the converted second digital image corresponds to an image pixel in the converted first digital image; determining an average RGB color value for each set of image pixels in the plurality of second sets of image pixels in the converted second digital image, and generating a lookup table to associate the average XYZ color value for each of the first sets of image pixels in the converted first digital image with the corresponding average RGB color value of the corresponding second set of image pixels in the converted second digital image.

The disclosure of the present application may also be embodied in a method comprising: obtaining a first digital image of a specimen scanned by a first imaging system to generate the first digital image of the specimen in XYZ color, the first digital image having a plurality of image pixels having a first image pixel size, obtaining a second digital image of the specimen scanned by a second imaging system to generate the second digital image of the specimen in RGB color, the second digital image having a plurality of image pixels having a second image pixel size, registering the first digital image to the second digital image to align the image data in the first digital image and the second digital image; and generating a lookup table that associates the XYZ color of the first digital image and the RGB color of the second digital image. Such a method may be implemented by a system such as the digital imaging device or the image processing device previously described with respect to FIGS. 4A and 12A-12D.

This method embodiment may further include providing XYZ color data to a display module for presentation of the second digital image on a display.

This method embodiment may further include storing the XYZ color data as part of the second digital image file.

This method embodiment may further include using pattern matching to register the first digital image to the second digital image.

This method embodiment may further include overlaying a grid on the specimen prior to creating the first and second digital images and using the grid in the first and second digital images to register the first digital image to the second digital image.

This method embodiment may further include combining pixels in one or more of the first digital image and the second digital image to cause the first image pixel size in the first digital image to be substantially the same as the second image pixel size in the second digital image.

This method embodiment may further include generating a single lookup table for a single stain.

This method embodiment may further include generating a single lookup table for a plurality of stains.

The disclosure of the present application may also be embodied in a method comprising: obtaining a first digital image of a specimen scanned by a first imaging system to generate the first digital image of the specimen in XYZ color, the first digital image having a plurality of image pixels having a first image pixel size, obtaining a second digital image of the specimen scanned by a second imaging system to generate the second digital image of the specimen in RGB color, the second digital image having a plurality of image pixels having a second image pixel size, registering the first digital image to the second digital image to align the image data in the first digital image and the second digital image; presenting the second digital image on a display; using a color measurement device to measure the XYZ values of the color presented on the display in a first region; and comparing the measured XYZ values of the first region to the XYZ values of the first digital image for the first region to validate the digital pathology system. Such a method may be implemented by a system such as the digital imaging device or the image processing device previously described with respect to FIGS. 4A and 12A-12D.

The disclosure of the present application may also be embodied in a method comprising: obtaining a first digital image of a specimen scanned by a first imaging system to generate the first digital image of the specimen in XYZ color, the first digital image having a plurality of image pixels having a first image pixel size; obtaining a second digital image of the specimen scanned by a second imaging system to generate the second digital image of the specimen in RGB color, the second digital image having a plurality of image pixels having a second image pixel size, registering the first digital image to the second digital image to align the image data in the first digital image and the second digital image; converting the first digital image and the second digital image to a common image pixel size; identifying a plurality of first sets of image pixels in the converted first digital image, wherein each image pixel in each set of image pixels in the plurality of first sets of image pixels in the converted first digital image has substantially a same XYZ color value; determining an average XYZ color value for each set of image pixels in the plurality of first sets of image pixels in the converted first digital image; identifying a corresponding plurality of second sets of image pixels in the converted second digital image, wherein each image pixel in each set of image pixels in the plurality of second sets of image pixels in the converted second digital image corresponds to an image pixel in the converted first digital image; determining an average RGB color value for each set of image pixels in the plurality of second sets of image pixels in the converted second digital image; generating a lookup table to associate the average XYZ color value for each of the first sets of image pixels in the converted first digital image with the corresponding average RGB color value of the corresponding second set of image pixels in the converted second digital image; presenting a first average RGB color value from the lookup table on a first region of a display; using a color measurement device to measure the XYZ value from the first region of the display; and comparing the measured XYZ value from the first region of the display to the average XYZ value corresponding to the first average RGB color value in the lookup table. Such a method may be implemented by a system such as the digital imaging device or the image processing device previously described with respect to FIGS. 4A and 12A-12D.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system comprising:
   a non-transitory computer readable medium configured to store data and executable programmed modules;
   at least one processor communicatively coupled with the non-transitory computer readable medium and configured to execute instructions stored thereon; and
   one or more software modules stored in the non-transitory computer readable medium and configured to, when executed by the at least one processor
   capture a first digital image of a specimen in XYZ color via a first imaging system, the first digital image having a plurality of image pixels having a first image pixel size,
   capture a second digital image of the specimen in RGB color via a second imaging system, the second digital image having a plurality of image pixels having a second image pixel size,
   align image data of the first digital image with corresponding image data of the second digital image,
   convert the first digital image and the second digital image to a common image pixel size, wherein the converted image pixels of the first digital image are aligned with corresponding converted image pixels of the second digital image,
   group image pixels in the first digital image into a plurality of first groups, wherein each image pixel in each one of the plurality of first groups has a substantially same XYZ color value,
   for each of the plurality of first groups of image pixels in the first digital image,
      determine an average XYZ color value for the first set of image pixels in the first group,
      identify a second group of image pixels in the second digital image that corresponds to the first group, wherein each image pixel in the second group of image pixels corresponds to an image pixel in the first group, and
      determine an average RGB color value for the image pixels in the second group, and
   generate a look up table to associate the average XYZ color value of each first group of image pixels in the first digital image with the average RGB color value of the corresponding second group of image pixels in the second digital image.

2. The system of claim 1, wherein each of the image pixels in each first group of image pixels in the first digital image is contiguous with at least one other image pixel in the first group of image pixels in the first digital image.

3. The system of claim 1, wherein at least some of the image pixels in one or more of the first groups of image pixels in the first digital image are not contiguous.

4. The system of claim 3, wherein each corresponding first group and second group represents one of a plurality of color indices in the look up table, wherein each image pixel in each of the plurality of first groups is assigned the average XYZ color value determined for that first group, and wherein each image pixel in each second group is assigned the average RGB color value determined for that second group.

5. A method comprising:
   capturing a first digital image of a specimen in XYZ color, via a first imaging system, the first digital image having a plurality of image pixels having a first image pixel size;
   capturing a second digital image of the specimen in RGB color, via a second imaging system, the second digital image having a plurality of image pixels having a second image pixel size;
   grouping image pixels in the first digital image into a plurality of first groups, wherein each image pixel in each one of the plurality of first groups has a substantially same XYZ color value;
   for each of the plurality of first groups of image pixels in the first digital image,
      determining an average XYZ color value for the image pixels in the first group,
      identifying a second group of image pixels in the second digital image that corresponds to the first group, wherein each image pixel in the second group of image pixels corresponds to an image pixel in the first group, and
      determining an average RGB color value for the image pixels in the second group; and
   generating a lookup table to associate the average XYZ color value of each first group of image pixels in the first digital image with the average RGB color value of the corresponding second group of image pixels in the second digital image.

6. The method of claim 5, further comprising aligning image data in the first digital image with image data in the second digital image, wherein identifying a second group of image pixels in the second digital image that corresponds to the first group is performed in accordance with said alignment.

7. The method of claim 6, wherein aligning image data of the first digital image with corresponding image data of the second digital image comprises converting the image pixels of the first digital image having the first image pixel size and the image pixels of the second digital image having the second image pixel size to a common image pixel size.

8. A a non-transitory computer readable medium that stores instructions that, when executed by a processor, cause the processor to:
  capture a first digital image of a specimen in XYZ color via a first imaging system;
  capture a second digital image of the specimen in RGB color via a second imaging system;
  register the first digital image to the second digital image to align image data in the first digital image and the second digital image;
  group image pixels in the first digital image into a plurality of first groups, wherein each image pixel in each one of the plurality of first groups has a substantially same XYZ color value;
  for each of the plurality of first groups of image pixels in the first digital image,
    determine an average XYZ color value for the image pixels in the first group,
    identify a second group of image pixels in the second digital image that corresponds to the first group, wherein each image pixel in the second group of image pixels corresponds to an image pixel in the first group, and
    determine an average RGB color value for the image pixels in the second group; and
  generate a lookup table that associates the average XYZ color value of each first group of image pixels in the first digital image with the average RGB color value of the corresponding second group of image pixels in the second digital image.

9. The non-transitory computer readable medium of claim 8, wherein the instructions further cause the processor to provide XYZ color data for presentation of the second digital image on a display.

10. The non-transitory computer readable medium of claim 8, wherein the instructions further cause the processor to embed the look up table in a file comprising the second digital image.

11. The non-transitory computer readable medium of claim 8, wherein registering the first digital image to the second digital image comprises matching patterns in the first digital image to patterns in the second digital image.

12. The non-transitory computer readable medium of claim 8, wherein registering the first digital image to the second digital image comprises overlaying a grid on the specimen prior to creating the first and second digital images and using the grid to align the first and second digital images.

13. The non-transitory computer readable medium of claim 8, wherein the instructions further cause the processor to:
  for each of the plurality of first groups, combine the image pixels in that first group into a first superpixel, and assign the average XYZ color value for that first group to the first superpixel; and,
  for each of the plurality of second groups, combine the image pixels in that second group into a second superpixel, and assign the average RGB color value to the second superpixel;
  wherein the look up table associates the average XYZ color value assigned to each first superpixel to the average RGB color value assigned to each corresponding second superpixel.

14. The non-transitory computer readable medium of claim 8, wherein the lookup table associates the average XYZ color values with the average RGB color values for a single stain.

15. The non-transitory computer readable medium of claim 8, wherein the lookup table associates the average XYZ color values with the average RGB values for a plurality of stains.

16. The system of claim 2, wherein the one or more software modules are configured to, when executed by the at least one processor:
  for each of the plurality of first groups, combine the image pixels in that first group into a first superpixel, and assign the average XYZ color value for that first group to the first superpixel; and,
  for each of the plurality of second groups, combine the image pixels in that second group into a second superpixel, and assign the average RGB color value to the second superpixel;
  wherein the look up table associates the average XYZ color value assigned to each first superpixel to the average RGB color value assigned to each corresponding second superpixel.

* * * * *